United States Patent
Rodriguez et al.

(10) Patent No.: US 12,190,618 B2
(45) Date of Patent: *Jan. 7, 2025

(54) METHODS, SYSTEMS, ARTICLES OF MANUFACTURE AND APPARATUS TO DECODE RECEIPTS BASED ON NEURAL GRAPH ARCHITECTURE

(71) Applicant: Nielsen Consumer LLC, Chicago, IL (US)

(72) Inventors: Dayron Rizo Rodriguez, Chicago, IL (US); Jose Javier Yebes Torres, Valladolid (ES)

(73) Assignee: Nielsen Consumer LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/191,642

(22) Filed: Mar. 28, 2023

(65) Prior Publication Data

US 2023/0306766 A1    Sep. 28, 2023

Related U.S. Application Data

(63) Continuation of application No. 17/364,419, filed on Jun. 30, 2021, now Pat. No. 11,625,930.

(51) Int. Cl.
*G06K 9/62* (2022.01)
*G06F 7/24* (2006.01)
(Continued)

(52) U.S. Cl.
CPC .............. *G06V 30/153* (2022.01); *G06F 7/24* (2013.01); *G06F 18/29* (2023.01); *G06N 3/02* (2013.01); *G06V 20/62* (2022.01); *G06V 30/10* (2022.01)

(58) Field of Classification Search
CPC ...... G06V 30/153; G06V 20/62; G06V 30/10; G06F 7/24; G06K 9/6232; G06K 9/6296; G06N 3/02
See application file for complete search history.

(56) References Cited

U.S. PATENT DOCUMENTS

| 3,323,135 A | 6/1967 | Miller |
| 5,410,611 A | 4/1995 | Huttenlocher et al. |

(Continued)

FOREIGN PATENT DOCUMENTS

| CA | 2957433 A1 | 9/2017 |
| CA | 2957433 C  | 6/2020 |

(Continued)

OTHER PUBLICATIONS

Park et al. "Cord: a Consolidated Receipt Dataset for Post-OCR Parsing. In Workshop on Document Intelligence," at NeurIPS 2019, 4 pages.

(Continued)

*Primary Examiner* — David F Dunphy
(74) *Attorney, Agent, or Firm* — Hanley, Flight & Zimmerman, LLC

(57) ABSTRACT

Methods, apparatus, systems, and articles of manufacture are disclosed to decode receipts based on neural graph architecture. An apparatus includes interface circuitry to obtain an image of a document; machine readable instructions; and programmable circuitry to execute the machine readable instructions to at least generate nodes for a feature graph based on features extracted from text boxes, the nodes including polar coordinates indicative of angular positions of the text boxes; pass the feature graph through a graph neural network to generate an adjacency matrix; and identify text lines in the image of the document by clustering the nodes by line based on the adjacency matrix.

20 Claims, 22 Drawing Sheets

(51) Int. Cl.
*G06F 18/20* (2023.01)
*G06N 3/02* (2006.01)
*G06V 20/62* (2022.01)
*G06V 30/148* (2022.01)
*G06V 30/10* (2022.01)

(56) References Cited

U.S. PATENT DOCUMENTS

| | | |
|---|---|---|
| 5,606,690 A | 2/1997 | Hunter et al. |
| 7,454,063 B1 | 11/2008 | Kneisl et al. |
| 7,792,709 B1 | 9/2010 | Trandal et al. |
| 8,285,047 B2 | 10/2012 | Nagarajan et al. |
| 8,494,281 B2 | 7/2013 | Nagarajan |
| 8,787,695 B2 | 7/2014 | Wu |
| 8,792,141 B2 | 7/2014 | Moore et al. |
| 8,983,170 B2 | 3/2015 | Nepomniachtchi et al. |
| 9,014,432 B2 | 4/2015 | Fan et al. |
| 9,158,744 B2 | 10/2015 | Rao et al. |
| 9,239,952 B2 | 1/2016 | Hsu |
| 9,262,686 B1 | 2/2016 | Singer et al. |
| 9,290,022 B2 | 3/2016 | Makabe |
| 9,298,685 B2 | 3/2016 | Barrus |
| 9,298,979 B2 | 3/2016 | Nepomniachtchi et al. |
| 9,323,135 B1 | 4/2016 | Veloso |
| 9,324,073 B2 | 4/2016 | Nepomniachtchi et al. |
| 9,384,839 B2 | 7/2016 | Avila et al. |
| 9,396,540 B1 | 7/2016 | Sampson |
| 9,684,842 B2 | 6/2017 | Deng |
| 9,710,702 B2 | 7/2017 | Nepomniachtchi et al. |
| 9,747,504 B2 | 8/2017 | Ma et al. |
| 9,760,786 B2 | 9/2017 | Sahagun et al. |
| 9,824,270 B1 | 11/2017 | Mao |
| 9,875,385 B1 | 1/2018 | Humphreys et al. |
| 10,032,072 B1 | 7/2018 | Tran et al. |
| 10,157,425 B2 | 12/2018 | Chelst et al. |
| 10,235,585 B2 | 3/2019 | Deng |
| 10,242,285 B2 | 3/2019 | Thrasher et al. |
| 10,395,772 B1 | 8/2019 | Lucas et al. |
| 10,679,283 B1 | 6/2020 | Pesce et al. |
| 11,257,049 B1 | 2/2022 | Durazo Almeida et al. |
| 11,321,956 B1 | 5/2022 | Geng |
| 11,410,446 B2 | 8/2022 | Shanmuganathan et al. |
| 11,414,053 B2 | 8/2022 | Tanaami et al. |
| 11,468,491 B2 | 10/2022 | Dalal et al. |
| 11,476,981 B2 | 10/2022 | Wei et al. |
| 11,562,557 B2 | 1/2023 | Miginnis et al. |
| 11,587,148 B2 | 2/2023 | Elder et al. |
| 11,593,552 B2 | 2/2023 | Sarkar |
| 11,609,956 B2 | 3/2023 | Jain |
| 11,625,930 B2 * | 4/2023 | Rodriguez ............ G06F 18/29 382/181 |
| 11,810,383 B2 | 11/2023 | Patel et al. |
| 11,842,035 B2 | 12/2023 | Jahjah et al. |
| 2002/0037097 A1 | 3/2002 | Hoyos et al. |
| 2003/0185448 A1 | 10/2003 | Seeger et al. |
| 2006/0232619 A1 | 10/2006 | Otsuka et al. |
| 2007/0041642 A1 | 2/2007 | Romanoff et al. |
| 2008/0205759 A1 | 8/2008 | Zandifar et al. |
| 2009/0164422 A1 | 6/2009 | Pacella |
| 2010/0306080 A1 | 12/2010 | Trandal et al. |
| 2011/0122443 A1 | 5/2011 | Otsuka et al. |
| 2011/0243445 A1 | 10/2011 | Uzelac et al. |
| 2011/0289395 A1 | 11/2011 | Breuel et al. |
| 2011/0311145 A1 | 12/2011 | Bern et al. |
| 2012/0183211 A1 | 7/2012 | Hsu et al. |
| 2012/0274953 A1 | 11/2012 | Makabe |
| 2012/0330971 A1 | 12/2012 | Thomas et al. |
| 2013/0058575 A1 | 3/2013 | Koo et al. |
| 2013/0170741 A9 | 7/2013 | Hsu et al. |
| 2014/0002868 A1 | 1/2014 | Landa et al. |
| 2014/0064618 A1 | 3/2014 | Janssen, Jr. |
| 2014/0188647 A1 | 7/2014 | Argue et al. |
| 2014/0195891 A1 | 7/2014 | Venkata Radha Krishna Rao et al. |
| 2015/0039479 A1 | 2/2015 | Gotanda et al. |
| 2015/0127428 A1 | 5/2015 | Gharachorloo et al. |
| 2015/0169951 A1 | 6/2015 | Khintsitskiy et al. |
| 2015/0254778 A1 | 9/2015 | Kmak et al. |
| 2015/0317642 A1 | 11/2015 | Argue et al. |
| 2015/0363792 A1 | 12/2015 | Arini et al. |
| 2015/0363822 A1 | 12/2015 | Rowe et al. |
| 2016/0005189 A1 | 1/2016 | Gray |
| 2016/0034863 A1 | 2/2016 | Ross |
| 2016/0063469 A1 | 3/2016 | Etzion |
| 2016/0125383 A1 | 5/2016 | Chan |
| 2016/0171585 A1 | 6/2016 | Singh et al. |
| 2016/0203625 A1 | 7/2016 | Khan et al. |
| 2016/0210507 A1 | 7/2016 | Abdollahian |
| 2016/0234431 A1 | 8/2016 | Kraft et al. |
| 2016/0307059 A1 | 10/2016 | Chaudhury et al. |
| 2016/0342863 A1 | 11/2016 | Kwon et al. |
| 2017/0293819 A1 | 10/2017 | Deng |
| 2018/0005345 A1 | 1/2018 | Apodaca et al. |
| 2018/0053045 A1 | 2/2018 | Lorenzini et al. |
| 2018/0060302 A1 | 3/2018 | Liang et al. |
| 2018/0317116 A1 | 11/2018 | Komissarov et al. |
| 2019/0026803 A1 | 1/2019 | De Guzman |
| 2019/0050639 A1 | 2/2019 | Ast |
| 2019/0080207 A1 | 3/2019 | Chang et al. |
| 2019/0171900 A1 | 6/2019 | Thrasher et al. |
| 2019/0244020 A1 | 8/2019 | Yoshino et al. |
| 2019/0325211 A1 | 10/2019 | Ordonez et al. |
| 2019/0332662 A1 | 10/2019 | Middendorf et al. |
| 2019/0354818 A1 | 11/2019 | Reisswig et al. |
| 2020/0097718 A1 | 3/2020 | Schäfer |
| 2020/0142856 A1 | 5/2020 | Neelamana |
| 2020/0151444 A1 | 5/2020 | Price et al. |
| 2020/0151902 A1 | 5/2020 | Almazán et al. |
| 2020/0175267 A1 | 6/2020 | Schäfer et al. |
| 2020/0249803 A1 | 8/2020 | Sobel et al. |
| 2020/0364451 A1 | 11/2020 | Ammar et al. |
| 2020/0401798 A1 | 12/2020 | Foncubierta Rodriguez et al. |
| 2020/0410231 A1 | 12/2020 | Chua et al. |
| 2021/0004880 A1 | 1/2021 | Benkreira et al. |
| 2021/0019287 A1 | 1/2021 | Prasad et al. |
| 2021/0034856 A1 | 2/2021 | Torres et al. |
| 2021/0090694 A1 | 3/2021 | Colley et al. |
| 2021/0117665 A1 | 4/2021 | Simantov et al. |
| 2021/0117668 A1 | 4/2021 | Zhong et al. |
| 2021/0142092 A1 | 5/2021 | Zhao et al. |
| 2021/0149926 A1 | 5/2021 | Komninos et al. |
| 2021/0158038 A1 | 5/2021 | Shanmuganathan et al. |
| 2021/0216765 A1 | 7/2021 | Xu et al. |
| 2021/0248420 A1 | 8/2021 | Zhong et al. |
| 2021/0295101 A1 * | 9/2021 | Tang ................... G06V 30/412 |
| 2021/0319217 A1 | 10/2021 | Wang et al. |
| 2021/0334737 A1 | 10/2021 | Balaji et al. |
| 2021/0343030 A1 | 11/2021 | Sagonas et al. |
| 2021/0357710 A1 | 11/2021 | Zhang et al. |
| 2021/0406533 A1 | 12/2021 | Arroyo et al. |
| 2022/0004756 A1 | 1/2022 | Jennings et al. |
| 2022/0114821 A1 | 4/2022 | Arroyo et al. |
| 2022/0189190 A1 | 6/2022 | Arroyo et al. |
| 2022/0198185 A1 | 6/2022 | Prebble |
| 2022/0383651 A1 | 12/2022 | Shanmuganathan et al. |
| 2022/0397809 A1 | 12/2022 | Talpade et al. |
| 2022/0414630 A1 | 12/2022 | Yebes Torres et al. |
| 2023/0004748 A1 | 1/2023 | Rodriguez et al. |
| 2023/0005286 A1 | 1/2023 | Yebes Torres et al. |
| 2023/0008198 A1 | 1/2023 | Gadde et al. |
| 2023/0196806 A1 | 6/2023 | Ramalingam et al. |
| 2023/0214899 A1 | 7/2023 | Martínez Cebrián et al. |
| 2023/0230408 A1 | 7/2023 | Arroyo et al. |
| 2023/0394859 A1 | 12/2023 | Montero et al. |

FOREIGN PATENT DOCUMENTS

| | | |
|---|---|---|
| CN | 103123685 A | 5/2013 |
| CN | 104866849 A | 8/2015 |
| CN | 108229397 A | 6/2018 |
| CN | 108829397 A | 11/2018 |
| CN | 109389124 A | 2/2019 |
| CN | 108229397 B | 8/2020 |
| CN | 112446351 A | 3/2021 |

(56) References Cited

FOREIGN PATENT DOCUMENTS

| | | | |
|---|---|---|---|
| CN | 112560862 | A | 3/2021 |
| DE | 202013005144 | U1 | 10/2013 |
| GB | 2595412 | A | 11/2021 |
| JP | H0749529 | A | 2/1995 |
| JP | 2008021850 | A | 1/2008 |
| JP | 2008210850 | A | 9/2008 |
| JP | 2008211850 | A | 9/2008 |
| JP | 2019139737 | A | 8/2019 |
| JP | 2013041145 | A1 | 3/2023 |
| KR | 101831204 | B1 | 2/2018 |
| TW | 200821850 | A | 5/2008 |
| WO | 2013041145 | A1 | 3/2013 |
| WO | 2013044145 | A1 | 3/2013 |
| WO | 2018054326 | A1 | 3/2018 |
| WO | 2018201423 | A1 | 11/2018 |
| WO | 2020194004 | A1 | 10/2020 |
| WO | 2022006295 | A1 | 1/2022 |
| WO | 2022123199 | A1 | 6/2022 |

OTHER PUBLICATIONS

Wang et al. "LiLT: a Simple yet Effective Language-Independent Layout Transformer for Structured Document Understanding", in Annual Meeting of the Association for Computational Linguistics (ACL), arXiv, Feb. 28, 2022, 11 pages.

United States Patent and Trademark Office, "Advisory Action," issued in connection with U.S. Appl. No. 16/692,797, dated Feb. 16, 2022, 2 pages.

Deepdive, "Distant Supervision," Online available on Stanford University website, retrieved on Apr. 1, 2022, 2 pages, [retrieved from: http://deepdive.stanford.edu/distant supervision].

Datasetlist, "Annotation tools for building datasets," Labeling tools—List of labeling tools, Datasetlist.com, updated Dec. 2021, downloaded on Apr. 1, 2022, 14 pages. [retrieved from: https://www.datasetlist.com/tools/].

NielsenIQ Brandbank, "Nielsen Brandbank Product Library," Online Available, Retrieved on Apr. 1, 2022, 5 pages. [retrieved from: https://www.brandbank.com/US/product-librarv/].

Github, "Fiat tool—Fast Image Data Annotation Tool," Github.com, downloaded on Apr. 1, 2022, 30 pages, [retrieved from: https://github.com/christopher5106/FastAimotationTool].

United States Patent and Trademark Office, "Notice of Allowance and Fee(s)Due," issued in connection with U.S. Appl. No. 16/692,797, dated Apr. 5, 2022, 10 pages.

Github, "Doccano tool," Github.com, downloaded on Apr. 11, 2022, 12 pages. [retrieved from:https://github.com/doccano/doccano].

United States Patent and Trademark Office, "Corrected Notice of Allowability," issued in connection with United States U.S. Appl. No. 16/692,797, dated Apr. 22, 2022, 3 pages.

International Searching Authority, "International Preliminary Report on Patentability Chapter I", issued in connection with International Patent Application No. PCT/US2020/061269, dated Jun. 2, 2022, 6 Pages.

International Searching Authority, "International Search Report," issued in connection with PCT No. PCT/US2022/034570, dated Jun. 22, 2022, 3 pages.

International Searching Authority, "Written Opinion," issued in connection with PCT No. PCT/US2022/034570, dated Jun. 22, 2022, 5 pages.

European Patent Office, "Communication pursuant to Rules 161(2) and 162 EPC," issued in connection with European patent appl. No. 20891012.5-1218, dated Jun. 29, 2022, 3 pages.

Datasetlist, "A tool using OpenCV to annotate images for image classification, optical character reading, . . . ," Datasetlist.com, dated Jul. 13, 2022, 30 pages.

United States Patent and Trademark Office, "Non-Final Office Action," issued in connection with U.S. Appl. No. 17/345,940, dated Aug. 18, 2022, 8 Pages.

International Searching Authority, "International Search Report," issued in connection with International Patent Appl. No. PCT/US2023/011859, dated Jun. 1, 2023, 3 pages.

United States Patent and Trademark Office, "Non-Final Office Action", issued in connection with U.S. Appl. No. 17/075,675, dated Sep. 22, 2022, 12 Pages.

European Patent Office, "Extended Search Report," issued in connection with European Patent Appl. No. 19921870.2, dated Oct. 12, 2022, 11 pages.

International Searching Authority, "International Search Report," issued in connection with PCT No. PCT/US2022/034570, dated Oct. 20, 2022, 3 pages.

International Searching Authority, "Written Opinion," issued in connection with PCT No. PCT/US2022/034570, dated Oct. 20, 2022, 5 pages.

International Searching Authority, "Written Opinion," issued in connection with International Patent Appl. No. PCT/US2023/011859, dated Jun. 1, 2023, 4 pages.

European Patent Office, "Communication pursuant to Rules 70(2) and 70a(2) EPC," issued in connection with Application No. 19921870.2, dated Nov. 2, 2022, 1 page.

United States Patent and Trademark Office, "Notice of Allowance and Fee(s) Due," issued in connection with U.S. Appl. No. 17/364,419, dated Nov. 4, 2022, 10 pages.

Canadian Patent Office, "Examiner's Report," issued in connection with Canadian Patent Application No. 3,124,868, mailed on Nov. 10, 2022, 4 pages.

United States Patent and Trademark Office, "Corrected Notice of Allowability", issued in connection with U.S. Appl. No. 17/364,419, dated Nov. 15, 2022, 2 pages.

European Patent Office, "Extended Search Report," in connection with European Patent Application No. 22180113.7, dated Nov. 22, 2022, 2 pages.

United States Patent and Trademark Office, "Non-Final Office Action," issued in connection with U.S. Appl. No. 17/379,280, dated Dec. 2, 2022, 14 Pages.

European Patent Office, "European Search Report," issued in connection with European patent Application No. 22184405.3-1207, dated Dec. 2, 2022, 7 pages.

International Searching Authority, "International Preliminary Report on Patentability," issued in connection with PCT No. PCT/US2021/039931, dated Dec. 13, 2022, 5 pages.

United States Patent and Trademark Office, "Corrected Notice of Allowability," issued in connection with U.S. Appl. No. 17/364,419, dated Jan. 4, 2023, 2 pages.

European Patent Office, "Communication Pursuant to Rule 69 EPC," issued in connection with European Patent Application No. 22180113.7, dated Jan. 10, 2023, 2 pages.

International Searching Authority, "International Preliminary Report on Patentability," issued in connection with PCT Application No. PCT/US2021/039931, dated Jan. 12, 2023, 6 pages.

United States Patent and Trademark Office, "Non-Final Office Action," issued in connection with U.S. Appl. No. 17/883,309, dated Jan. 20, 2023, 14 pages.

European Patent Office, "Communication pursuant to Rule 69 EPC," in connection with European Patent Application No. 22184405.3, dated Jan. 23, 2023, 2 pages.

United States Patent and Trademark Office, "Corrected Notice of Allowability", issued in connection with U.S. Appl. No. 17/364,419, dated Feb. 15, 2023, 2 pages.

United Kingdom Patent Office, "Examination Report under section 18(3)," issued in connection with GB Application No. 2112299.9, dated Feb. 17, 2023, 2 pages.

United States Patent and Trademark Office, "Final Office Action", issued in connection with U.S. Appl. No. 17/075,675, dated Mar. 7, 2023, 11 Pages.

United States Patent and Trademark Office, "Non-Final Office Action," issued in connection with U.S. Appl. No. 17/345,940, dated Mar. 16, 2023, 13 Pages.

United States Patent and Trademark Office, "Final Office Action," issued in connection with U.S. Appl. No. 17/379,280, dated May 5, 2023, 17 pages.

(56) References Cited

OTHER PUBLICATIONS

United States Patent and Trademark Office, "Notice of Allowance and Fee(s) Due," issued in connection with U.S. Appl. No. 17/883,309, dated May 11, 2023, 9 pages.

European Patent Center, "Extended European Search Report," issued in connection with Application No. 22214553.4, dated May 17, 2023, 9 pages.

United States Patent and Trademark Office, "Advisory Action," issued in connection with U.S. Appl. No. 17/075,675, dated May 30, 2023, 3 pages.

United States Patent and Trademark Office, "Corrected Notice of Allowability," issued in connection with U.S. Appl. No. 17/345,940, dated Jul. 20, 2023, 3 pages.

United States Patent and Trademark Office, "Notice of Allowance," issued in U.S. Appl. No. 17/075,675, mailed on Jun. 26, 2023, 8 pages.

United States Patent and Trademark Office, "Notice of Allowance and Fee(s) Due," issued in connection with U.S. Appl. No. 17/345,940, dated Jul. 7, 2023, 8 pages.

United Kingdom Intellectual Property Office, "Intention to Grant under Section 18(4)," issued in connection with United Kingdom Patent Application No. 2112299.9, dated Jul. 13, 2023, 2 pages.

United States Patent and Trademark Office, "Advisory Action," issued in connection with U.S. Appl. No. 17/379,280, mailed on Jul. 18, 2023, 3 pages.

Oliveira et al., "dhSegment: a generic deep-learning approach for document segmentation," in 16th International Conference on Frontiers in Handwriting Recognition (ICFHR), dated Aug. 14, 2019, 6 pages.

Zhong et al., "PubLayNet: largest dataset ever for document layout analysis," in International Conference on Document Analysis and Recognition (ICDAR), dated Aug. 16, 2019, 8 pages.

International Searching Authority, "International Search Report and Written Opinion," issued in connection with PCT application No. PCT/IB2019/000299, dated Dec. 23, 2019, 9 pages.

Github, "Tesseract OCR," Tesseract Repository on GitHub, retrieved from: https://github.com/tesseract-ocr/, dated 2020, 3 pages.

Wang et al., "DocStruct: a Multimodal Method to Extract Hierarchy Structure in Document for General Form Understanding", in Empirical Methods in Natural Language Processing (EMNLP), pp. 898-908, dated 2020, 11 pages.

Zhu et al., "Heterogeneous Mini-Graph Neural Network and Its Application to Fraud Invitation Detection." 2020 IEEE International Conference on Data Mining (ICDM), dated 2020, 9 pages.

Dong et al. "HNHN: Hypergraph Networks with Hyperedge Neurons," ArXiv abs/2006.12278, dated 2020, 11 pages.

Carbonell et al., "Named Entity Recognition and Relation Extraction with Graph Neural Networks in Semi Structured Documents," in International Conference on Pattern Recognition (ICPR), pp. 9622-9627, dated 2021, 6 pages.

Zhong et al., "Hierarchical Message-Passing Graph Neural Networks," ArXiv abs/2009.03717, dated 2020, 29 pages.

Chen et al., "HGMF: Heterogeneous Graph-based Fusion for Multimodal Data with Incompleteness," Proceedings of the 26th ACM SIGKDD International Conference on Knowledge Discovery & Data Mining, dated 2020, 11 pages.

Wick et al., "Calamari—A High-Performance Tensorflow-based Deep Learning Package for Optical Character Recognition," Digital Humanities Quarterly, retrieved from: https://arxiv.org/ftp/arxiv/papers/1807/1807.02004.pdf, dated 2020, 12 pages.

Dwivedi et al., "Benchmarking Graph Neural Networks." ArXiv abs/2003.00982, dated 2020, 49 pages.

Zacharias et al., "Image Processing Based Scene-Text Detection and Recognition with Tesseract," arXiv (CoRR), dated Apr. 17, 2020, 6 pages.

Xu et al., "LayoutLM: Pre-training of Text and Layout for Document Image Understanding," in International Conference on Knowledge Discovery & Data Mining (SIGKDD), dated Jun. 16, 2020, 9 pages.

Yu et al., "Pick: Processing Key Information Extraction from Documents using Improved Graph Learning—Convolutional Networks," in International Conference on Pattern Recognition (ICPR), dated Jul. 18, 2020, 8 pages. [retrieved from: https://arxiv.org/pdf/2004.07464.pdf].

Huang et al. "LayoutLMv3: Pre-training for Document AI with Unified Text and Image Masking." ArXiv abs/2204.08387 (2022), 10 pages.

Arroyo et al., "Multi-label classification of promotions in digital leaflets using textual and visual information," Proceedings of the Workshop on Natural Language Processing in E-Commerce (EComNLP), pp. 11-20, Barcelona, Spain (Online), dated Dec. 12, 2020, 10 pages.

Gu et al., "UniDoc: Unified Pretraining Framework for Document Understanding," NeurIPS, dated 2021, 12 pages.

Gopal et al. "What is Intelligent Document Processing?" Nano Net Technologies, retrieved from: https://nanonets.com/blog/intelligent-document-processing/, dated 2021, 21 pages.

Qian et al. "A region-based hypergraph network for joint entity-relation extraction", in Knowledge-Based Systems. vol. 228, dated 2021, 8 pages.

Zhang et al. "Entity Relation Extraction as Dependency Parsing in Visually Rich Documents", in Empirical Methods in Natural Language Processing (EMNLP), dated 2021, 10 pages.

Hwang et al. "Cost-effective End-to-end Information Extraction for Semi-structured Document Images", in Empirical Methods in Natural Language Processing (EMNLP), dated 2021, 9 pages.

Hong et al., "Bros: a Pre-trained Language Model Focusing on Text and Layout for Better Key information Extraction from Documents," arXiv (CoRR), dated 2021, 13 pages, [retrieved from: https://arxiv.org/pdf/2108.04539.pdf].

Davis et al., "Visual Fudge: Form Understanding via Dynamic Graph Editing", in International Conference on Document Analysis and Recognition (ICDAR), dated 2021, 16 pages.

Garncarek et al., "Lambert: Layout-Aware Language Modeling for Information Extraction," ICDAR, dated 2021, 16 pages.

Deepdive, "Distant Supervision," Stanford University website, http://deepdive.stanford.edu/distant_supervision, dated 2021, 2 pages.

Shen et al., "LayoutParser: a Unified Toolkit for Deep Learning Based Document Image Analysis," in International Conference on Document Analysis and Recognition (ICDAR), 2021, 16 pages, retrieved from: https://arxiv.org/odf/2103.15348.pdf.

Villota et al., "Text Classification Models for Form Entity Linking", arXiv, dated Dec. 14, 2021, 10 pages.

Huang et al., "UniGNN: a Unified Framework for Graph and Hypergraph Neural Networks." IJCAI, arXiv, dated May 3, 2021, 9 pages.

Li et al., "StrucTexT: Structured Text Understanding with Multi-Modal Transformers", in ACM International Conference on Multimedia (ACM Multimedia), pp. 1912-1920., arXiv, dated Nov. 8, 2021, 9 pages.

Nguyen Dang et al., "End-to-End Hierarchical Relation Extraction for Generic Form Understanding," in International Conference on Pattern Recognition (ICPR), pp. 5238-5245, arXiv, dated Jun. 2, 2021, 8 pages.

Prabhu et al., "MTL-FoUn: a Multi-Task Learning Approach to Form Understanding," in International Conference on Document Analysis and Recognition (ICDAR), pp. 377-388, 2021, 5 pages.

Xu et al., "LayoutLMv2: Multi-modal Pre-training for Visually-rich Document Understanding," ACL, dated 2021, 13 pages.

Kim et al., "Donut: Document Understanding Transformer without OCR," arXiv, dated Oct. 6, 2022, 29 pages.

Ma et al., "Graph Attention Networks with Positional Embeddings," ArXiv abs/2105.04037, Oct. 24, 2021, 13 pages.

International Searching Authority, "International Search Report," mailed in connection with International Patent Application No. PCT/US2020/061269, on Mar. 11, 2021, 3 pages.

International Searching Authority, "Written Opinion," mailed in connection with International Patent Application No. PCT/US2020/061269, on Mar. 11, 2021, 4 pages.

United States Patent and Trademark Office, "Non-Final Office Action," issued in connection with U.S. Appl. No. 16/692,797, dated Mar. 16, 2021, 12 pages.

(56) References Cited

OTHER PUBLICATIONS

Google, "Detect Text in Images," Mar. 29, 2021, 16 pages. Retrieved from http://cloud.google.com/vision/docs/ocr.
Chen et al., "TextPolar: irregular scene text detection using polar representation," International Journal on Document Analysis and Recognition (IJDAR), May 23, 2021, 9 pages.
Shen et al., "LayoutParser: a Unified Toolkit for Deep Learning Based Document Image Analysis," in International Conference on Document Analysis and Recognition (ICDAR), Jun. 1, 2021, 16 pages. [retrieved from: https://arxiv.org/pdf/2103.15348.pdf].
Hwang et al., "Spatial Dependency Parsing for Semi-Structured Document Information Extraction," in International Joint Conference on Natural Language Processing (IJCNLP), Jul. 1, 2021, 14 pages. [retrieved from: https://arxiv.org/pdf/2005.00642.pdf].
Hong et al., "Bros: a Pre-trained Language Model Focusing on Text and Layout for Better Key Information Extraction from Documents," arXiv (CoRR), Sep. 10, 2021, 13 pages. [retrieved from: https://arxiv.org/pdf/2108.04539.pdf].
Appalaraju et al., "DocFormer: End-to-End Transformer for Document Understanding," arXiv (CoRR), Sep. 20, 2021, 22 pages. [retrieved from: https://arxiv.org/pdf/2106.11539.pdf].
International Searching Authority, "International Preliminary Report on Patentability," issued in connection with International Patent Application No. PCT/IB2019/000299, mailed on Sep. 28, 2021, 5 pages.
United States Patent and Trademark Office, "Final Office Action," issued in connection with U.S. Appl. No. 16/692,797, dated Oct. 27, 2021, 14 pages.
International Searching Authority, "Search Report," issued in connection with Application No. PCT/US2021/039931, dated Nov. 4, 2021, 4 pages.
European Patent Office, "Communication pursuant to Rules 161(2) and 162 EPC," in connection with European Patent Application No. 19921870.2, issued Nov. 5, 2021, 3 pages.
Zhang et al., "Multimodal Pre-training Based on Graph Attention Network for Document Understanding," ArXivabs/2203.13530, Oct. 23, 2022, 13 pages.
International Searching Authority, "Written Opinion," issued in connection with Application No. PCT/US2021/039931, dated Nov. 4, 2021, 3 pages.
Smith et al., "Identification of Common Molecular Subsequences," Reprinted Journal of Molecular Biology, Academic Press Inc. (London) Ltd., pp. 195-197, dated 1981, 3 pages.
Govindan et al., "Character Recognition—a Review," Pattern Recognition, vol. 23, No. 7, pp. 671-683, published Jul. 20, 1990, 13 pages.
Poulovassilis et al., "A nested-graph model for the representation and manipulation of complex objects," ACM Trans. Inf. Syst. 12, dated 1994, 34 pages.
Hochreiter et al., "Long Short-Term Memory," Neural Computation 9, pp. 1735-1780, dated 1997, 46 pages.
Ng. et al., "On Spectral Clustering: Analysis and an algorithm," NIPS, dated 2001, 8 pages.
Crandall et al., "Extraction of special effects caption text events from digital video," IJDAR, Department of Computer Science and Engineering, The Pennsylvania State University, 202 Pond Laboratory, University Park, PA, accepted Sep. 13, 2022, pp. 138-157, 20 pages.
Lowe, "Distinctive Image Features from Scale-Invariant Key points," International Journal of Computer Vision (HCV), published Jan. 5, 2004, 20 pages.
Marinai, "Introduction to Document Analysis and Recognition," Machine Learning in Document Analysis and Recognition, published 2008, 20 pages.
Vogel et al., "Parallel Implementations of Word Alignment Tool," Software Engineering, Testing, and Quality Assurance for Natural Language Processing, pp. 49-57, published Jun. 2008, 10 pages.
O'Gorman et al., "Document Image Analysis," IEEE Computer Society Executive Briefings, dated 2009, 125 pages.
Krizhevsky et al., "ImageNet Classification with Deep Convolutional Neural Networks," in International Conference on Neural Information Processing Systems (NIPS), published 2012, 9 pages.
Chung et al., "Empirical Evaluation of Gated Recurrent Neural Networks on Sequence Modeling," ArXivabs/1412.3555, dated 2014, 9 pages.
Nshuti, "Mobile Scanner and OCR (a First Step Towards Receipt to Spreadsheet)," published 2015, 3 pages.
Ronneberger et al., "U-Net: Convolutional Networks for Biomedical Image Segmentation," Medical Image Computing and Computer-Assisted Intervention (MICCAI), dated May 18, 2015, 8 pages.
Lecun et al., "Deep Learning," Nature, vol. 521, pp. 436-444, dated May 28, 2015, 9 pages.
Genereux et al., "NLP Challenges in Dealing with OCR-ed Documents of Derogated Quality," Workshop on Replicability and Reproducibility in Natural Language Processing, IJCAI 2015, dated Jul. 2015, 6 pages.
Konda et al., "Magellan: Toward Building Entity Matching Management Systems Over Data Science Stacks," Proceedings of the VLDB Endowment, vol. 9, No. 13, pp. 1581-1584, dated 2016, 4 pages.
Kim et al., "Character-Aware Neural Language Models," Proceedings of the Thirtieth AAAI Conference on Artificial Intelligence (AAAI'IC), pp. 2741-2749, dated 2016, 9 pages.
Feng et al., "Computer vision algorithms and hardware implementations: a survey," Integration: the VLSI Journal, vol. 69, pp. 309-320, dated Jul. 27, 2019, 12 pages.
Ren et al., "Faster R-CNN: Towards Real-Time Object Detection with Region Proposal Networks," in International Conference on Neural Information Processing Systems (NIPS), pp. 91-99, dated Jan. 6, 2016, 14 pages.
Osindero et al., "Recursive Recurrent Nets with Attention Modeling for OCR in the Wild," in Conference on Computer Vision and Pattern Recognition (CVPR), dated Mar. 9, 2016, 10 pages.
Redmon et al., "You Only Look Once: Unified, Real-Time Object Detection," in Conference on Computer Vision and Pattern Recognition (CVPR), dated May 9, 2016, 10 pages.
Joulin et al., "Bag of Tricks for Efficient Text Classification," in Proceedings of the 15th Conference of the European Chapter of the Association for Computational Linguistics, dated Aug. 9, 2016, 5 pages.
Kipf et al., "Semi-Supervised Classification with Graph Convolutional Networks." ArXiv abs/1609.02907, dated 2017, 14 pages.
Qasim et al., "Rethinking Table Recognition using Graph Neural Networks," in International Conference on Document Analysis and Recognition (ICDAR), dated Jul. 3, 2019, 6 pages.
Bojanowski et al., "Enriching Word Vectors with Subword Information," in Journal Transactions of the Association for Computational Linguistics, 2017, vol. 5, pp. 135-146, dated Jun. 2017, 12 pages.
Ozhiganov et al., "Deep Dive Into OCR for Receipt Recognition," DZone, dated Jun. 21, 2017, 18 pages.
Bartz et al., "STN-OCT: a Single Neural Network for Text Detection and Text Recognition," Computer Vision and Pattern Recognition, dated Jul. 27, 2017, 9 pages.
Vaswani et al., "Attention is all you need," in Advances in Neural Information Processing Systems, 31st Conference on Neural Information Processing Systems (NIPS 2017), Long Beach, CA, last revised Dec. 6, 2017, 15 pages.
Follmann et al., "MVTec D2S: Densely Segmented Supermarket Dataset," in European Conference on Computer Vision (ECCV), dated 2018, 17 pages.
Yadati et al., "HyperGCN: Hypergraph Convolutional Networks for Semi-Supervised Classification," ArXiv abs/1809.02589, dated 2018, 18 pages.
Elfwing et al., "Sigmoid-Weighted Linear Units for Neural Network Function Approximation in Reinforcement Learning," Neural networks: the official journal of the International Neural Network Society 107, dated 2018, 18 pages.
Devlin et al., "BERT: Pre-training of Deep Bidirectional Transformers for Language Understanding," in Conference of the North American Chapter of the Association for Computational Linguistics (NAACL-HLT), dated Jun. 24, 2019, 16 pages.

(56) References Cited

OTHER PUBLICATIONS

Velickovic et al., "Graph Attention Networks," ICLR 2018, ArXiv abs/1710.10903, dated 2018, 12 pages.
Ray et al., "U-PC: Unsupervised Planogram Compliance," in European Conference on Computer Vision (ECCV), dated 2018, 15 pages.
Hui, "mAP (mean Average Precision) for Object Detection," published Mar. 6, 2018, 2 pages.
Mudgal et al., "Deep learning for entity matching: a design space exploration," in Proceedings of the 2018 International Conference on Management of Data, dated Jun. 10-15, 2018, 16 pages.
Akbik et al., "Contextual String Embeddings for Sequence Labeling," in Proceedings of the 27th International Conference on Computational Linguistics (COLING), dated Aug. 2018, 12 pages.
Huang et al., "Mask R-CNN with Pyramid Attention Network for Scene Text Detection," arXiv:1811.09058v1, pp. 1-9, dated Nov. 22, 2018, 9 pages.
Wikipedia, "Precision & Recall," Dec. 17, 2018 revision, 12 pages.
Liu et al., "RoBERTa: a Robustly Optimized BERT Pretraining Approach," ArXiv abs/1907.11692, dated 2019, 13 Pages.
Loshchilov et al., "Decoupled Weight Decay Regularization," ICLR, dated 2019, 19 Pages.
Guillaume et al., "FUNSD: a dataset for form understanding in noisy scanned documents," in International Conference on Document Analysis and Recognition (ICDAR), dated 2019, 6 pages.
Artificial Intelligence & Image Analysis, "Historic Document Conversion," Industry Paper, accessed on Jan. 30, 2019, 4 pages.
Artificial Intelligence & Image Analysis, "Intelligent Automation Eliminates Manual Data Entry From Complex Documents," White Paper, accessed on Jan. 30, 2019, 3 pages.
Canadian Intellectual Property Office, "Examiner's Report," issued in connection with Canadian Patent Application No. 3,124,868, dated Aug. 10, 2023, 5 pages.
United States Patent and Trademark Office, "Corrected Notice of Allowability," issued in connection with U.S. Appl. No. 17/883,309, dated Aug. 17, 2023, 2 Pages.
United Kingdom Intellectual Property Office, "Notification of Grant," issued in connection with United Kingdom Patent Application No. 2112299.9, dated Aug. 29, 2023, 2 pages.
Amazon, "Intelligent Document Processing," Amazon Web Services, https://aws.amazon.com/machine-learning/ml-use-cases/document-processing/fintech/, retrieved on Sep. 8, 2023, 6 pages.
United States Patent and Trademark Office, "Notice of Allowance and Fee(s) Due," issued in U.S. Appl. No. 17/075,675, dated on Oct. 10, 2023, 2 pages.
United States Patent and Trademark Office, "Non-Final Office Action," issued in connection with U.S. Appl. No. 17/710,538, dated Oct. 26, 2023, 6 Pages.
European Patent Office, "Extended European Search Report," issued in connection with European Patent Application No. 20891012.5, dated Nov. 17, 2023, 12 pages.
European Patent Office, "Communication pursuant to Rules 70(2) and 70a(2) EPC," issued in connection with European Patent Application No. 20891012.5, dated Dec. 5, 2023, 1 page.
United States Patent and Trademark Office, "Non-Final Office Action" issued in connection with U.S. Appl. No. 17/598,792, mailed on Dec. 29, 2023, 17 pages.
International Searching Authority, "International Preliminary Report on Patentability," issued in connection with International Patent Application No. PCT/US2022/034570, issued on Dec. 14, 2023, 7 pages.
Visich, "Bar Codes and Their Applications," Research Foundation of State University of New York, 1990, 59 pages.
Li et al., "StructuralLM: Structural Pre-training for Form Understanding," 59th Annual Meeting of the Association for Computational Linguistics, Aug. 2021, 10 pages.
European Patent Office, "Communication pursuant to Article 94(3) EPC," issued in connection with European Patent Application No. 19 921 870.2-1207, on Apr. 9, 2024, 7 pages.
United States Patent and Trademark Office, "Supplemental Notice of Allowability," issued in connection with U.S. Appl. No. 17/710,538, dated May 8, 2024, 3 pages.
United States Patent and Trademark Office, "Notice of Allowance and Fee(s) Due," issued in connection with U.S. Appl. No. 17/598,792, dated Jun. 17, 2024, 9 pages.
United States Patent and Trademark Office, "Corrected Notice of Allowability," issued in connection with U.S. Appl. No. 17/598,792, dated Jul. 3, 2024, 2 pages.
United States Patent and Trademark Office, "Final Office Action," issued in connection with U.S. Appl. No. 17/566,135, dated Jul. 25, 2024, 17 pages.
Levenshtein, "Binary Codes Capable of Correcting Deletions, Insertions, and Reversals," Soviet Physics—Doklady, Cybernetics and Control Theory, pp. 707-710, vol. 10, No. 8, Feb. 1966, 4 pages.
Leicester et al., "Using Scanner Technology to Collect Expenditure Data," Fiscal Studies, vol. 30, Issue 3-4, 2009, 29 pages.
Oliveira et al., "A New Method for Text-Line Segmentation for Warped Documents," International Conference Image Analysis and Recognition, Jun. 21, 2010, 11 pages.
Velickovic et al. "Graph Attention Networks," International Conference on Learning Representations, Feb. 4, 2018, 12 pages.
Li et al., "Extracting Figures and Captions from Scientific Publications," Short Paper, CIKM18, Oct. 22-26, 2018, Torino, Italy, 4 pages.
Nathancy, "How do I make masks to set all of image background, except the text, to white?", stakoverflow.com, https://stackoverflow.com/questions/56465359/how-do-i-make-masks-to-set-all-of-image-background-except-the-text-to-white, Jun. 5, 2019, 5 pages.
Hu et al., "Semi-supervised Node Classification via Hierarchical Graph Convolutional Networks," 2019 International Joint Conference on Artificial Intelligence, Aug. 10, 2019, 8 pages.
Jaume et al., "FUNSD: a Dataset for Form Understanding in Noisy Scanned Documents," International Conference on Document Analysis and Recognition (ICDAR), Sep. 20, 2019, 6 pages.
Bandyopadhyay et al., "Hypergraph Attention Isomorphism Network by Learning Line Graph Expansion." 2020 IEEE International Conference on Big Data (Big Data) (2020): 669-678, 10 pages.
Xu et al. "LayoutXLM: Multimodal Pre-training for Multilingual Visually-rich Document Understanding", arXiv, Apr. 2021, 10 pages.
Li et al. "SelfDoc: Self-Supervised Document Representation Learning." 2021 IEEE/CVF Conference on Computer Vision and Pattern Recognition (CVPR) (2021): 5648-5656, 10 pages.
Tang et al., "MatchVIE: Exploiting Match Relevancy between Entities for Visual Information Extraction", in International Joint Conference on Artificial Intelligence (IJCAI), pp. 1039-1045, 2021, 7 pages.
Powalski et al., "Going Full-TILT Boogie on Document Understanding with Text-Image-Layout Transformer," International Conference on Document Analysis and Recognition, Sep. 5, 2021, 17 pages.
Datasetlist, "Annotation tools for building datasets," Labeling tools—List of Labeling tools, Datasetlist.com, updated Dec. 2021, downloaded on Apr. 1, 2022, 12 pages. [retrieved from https://www.datasetlist.com/tools/].
Nielsen Iq, "Nielsen Brandbank Product Library—Power the Path to Purchase With Brand Approved Content," URL: [https://www.brandbank.com/US/product-library/], retrieved on Apr. 1, 2022, 5 pages.
Gu et al., "XYLayoutLM: Towards Layout-Aware Multimodal Networks for Visually-Rich Document Understanding," Conference on Computer Vision and Pattern Recognition (CVPR), Jun. 18, 2022, 10 pages.
United States and Patent and Trademark Office, "Non-Final Office Action," issued in connection with U.S. Appl. No. 17/566,135, dated Mar. 27, 2024, 13 pages.
United States Patent and Trademark Office, "Non-Final Office Action," issued in connection with U.S. Appl. No. 18/476,978, dated Apr. 18, 2024, 20 pages.
United States Patent and Trademark Office, "Notice of Allowance and Fee(s) Due," issued in connection with U.S. Appl. No. 17/710,538, dated Apr. 19, 2024, 8 pages.

(56) References Cited

OTHER PUBLICATIONS

United States Patent and Trademark Office, "Non-Final Office Action," issued in connection with U.S. Appl. No. 17/710,660, on May 28, 2024, 9 pages.
Canadian Intellectual Property Office, "Office Action," issued in connection with Canadian Patent Application No. 3,182,471, dated May 28, 2024, 5 pages.
United States Patent and Trademark Office, "Notice of Allowance and Fee(s) Due," issued in connection with U.S. Appl. No. 17/710,538, dated Aug. 14, 2024, 8 pages.
United States Patent and Trademark Office, "Final Office Action," issued in connection with U.S. Appl. No. 18/476,978, dated Aug. 14, 2024, 22 pages.
International Searching Authority, "International Preliminary Report on Patentability," issued in connection with International Application No. PCT/US2023/011859, mailed on Aug. 15, 2024, 6 pages.
United States Patent and Trademark Office, "Notice of Allowance and Fee(s) Due," issued in connection with U.S. Appl. No. 17/710,660, dated Sep. 25, 2024, 9 pages.
United States Patent and Trademark Office, "Notice of Allowance and Fee(s) Due," issued in connection with U.S. Appl. No. 17/598,792, dated Aug. 27, 2024, 9 pages.
United States Patent and Trademark Office, "Notice of Allowance and Fee(s) Due," issued in connection with U.S. Appl. No. 17/710,538, dated Sep. 11, 2024, 3 pages.
United States Patent and Trademark Office, "Non-Final Office Action," issued in connection with U.S. Appl. No. 17/710,649, dated Sep. 16, 2024, 12 pages.
United States Patent and Trademark Office, "Advisory Action," issued in connection with U.S. Appl. No. 18/476,978, dated Oct. 7, 2024, 3 pages.
United States Patent and Trademark Office, "Corrected Notice of Allowability," issued in connection with U.S. Appl. No. 17/710,660, dated Oct. 9, 2024, 2 pages.
United States Patent and Trademark Office, "Corrected Notice of Allowability," issued in connection with U.S. Appl. No. 17/598,792, dated Oct. 10, 2024, 2 pages.
United States Patent and Trademark Office, "Corrected Notice of Allowability," issued in connection with U.S. Appl. No. 18/191,642, dated Oct. 11, 2024, 2 pages.
United States Patent and Trademark Office, "Notice of Allowance and Fee(s) Due," issued in connection with U.S. Appl. No. 17/566,135, dated Oct. 11, 2024, 9 pages.
United States Patent and Trademark Office, "Corrected Notice of Allowability," issued in connection with U.S. Appl. No. 17/710,660, dated Oct. 30, 2024, 2 pages.
United States Patent and Trademark Office, "Corrected Notice of Allowability," issued in connection with U.S. Appl. No. 17/566,135, dated Oct. 23, 2024, 9 pages.

\* cited by examiner

202

| ND PERCENT | INCOME SALE | | PRODUCTS | IN NEED | ACCOUNTING | PRESSURIZED |
|---|---|---|---|---|---|---|
| | FOR | PH INCOME | | | | |
| 1.16 | WITH | 16.8 | EXERCISE ESTI- | 1633 | | |
| 446.00 | NORTH | 0.001 | TO | 04 | PILL, PT | SINCE |
| 116.3 | DISCONTINUED | 134.8 | BERKELEY, | | TEMPERATURES | |
| 24.0 | TURBULENT CHANGES | 4,406 | ANIONS | 37.1 | LONG | CASHING PARADOXA |
| | | 133 | SANIDINE | 628.00 | CATER DEPLETION | NO MEGATON |
| | AND | 229 | LIABILITY UNREALIZED | 4 | MATERIAL MITE | ACHIEVABLE EARNED |

204

| ND PERCENT | INCOME SALE | | PRODUCTS | IN NEED | ACCOUNTING | PRESSURIZED |
|---|---|---|---|---|---|---|
| | FOR | PH INCOME | | | | |
| 1.16 | WITH | 16.8 | EXERCISE ESTI- | 1633 | | |
| 446.00 | NORTH | 0.001 | TO | 04 | PILL, PT | SINCE |
| 116.3 | DISCONTINUED | 134.8 | BERKELEY, | | TEMPERATURES | |
| 24.0 | TURBULENT CHANGES | 4,406 | ANIONS | 37.1 | LONG | CASHING PARADOXA |
| | | 133 | SANIDINE | 628.00 | CATER DEPLETION | NO MEGATON |
| | AND | 229 | LIABILITY UNREALIZED | 4 | MATERIAL MITE | ACHIEVABLE EARNED |

206

| ND PERCENT | INCOME SALE | | PRODUCTS | IN NEED | ACCOUNTING | PRESSURIZED |
|---|---|---|---|---|---|---|
| | FOR | PH INCOME | | | | |
| 1.16 | WITH | 16.8 | EXERCISE ESTI- | 1633 | | |
| 446.00 | NORTH | 0.001 | TO | 04 | PILL, PT | SINCE |
| 116.3 | DISCONTINUED | 134.8 | BERKELEY, | | TEMPERATURES | |
| 24.0 | TURBULENT CHANGES | 4,406 | ANIONS | 37.1 | LONG | CASHING PARADOXA |
| | | 133 | SANIDINE | 628.00 | CATER DEPLETION | NO MEGATON |
| | AND | 229 | LIABILITY UNREALIZED | 4 | MATERIAL MITE | ACHIEVABLE EARNED |

FIG. 2
(Prior Art)

Line Detection (Framework) 300

EXAMPLE OF LINE ADJACENCY MATRIX

DISTORTIONS IN CAPTURE RECEIPT IMAGES

METHODS, SYSTEMS, ARTICLES OF MANUFACTURE AND APPARATUS TO DECODE RECEIPTS BASED ON NEURAL GRAPH ARCHITECTURE

RELATED APPLICATION

This patent arises from a continuation of U.S. patent application Ser. No. 17/364,419 (now U.S. Pat. No. 11,625, 930), which was filed on Jun. 30, 2021. U.S. patent application Ser. No. 17/364,419 is hereby incorporated herein by reference in its entirety. Priority to U.S. patent application Ser. No. 17/364,419 is hereby claimed.

FIELD OF THE DISCLOSURE

This disclosure relates generally to text processing and, more particularly, to methods, systems, articles of manufacture and apparatus to decode receipts based on neural graph architecture.

BACKGROUND

In recent years, Optical Character Recognition (OCR) has been used to distinguish printed or handwritten text characters digitally. In recent years, Graph Neural Networks (GNNs) have been used to represent data in graphical format as vertices of a graph.

BRIEF DESCRIPTION OF THE DRAWINGS

FIG. 2 is an example illustration of results of the optical character recognition corresponding to the example framework of FIG. 1.

FIGS. 15-18 are examples of receipts decoded by the disclosed approach and the prior approach.

Figure 1:
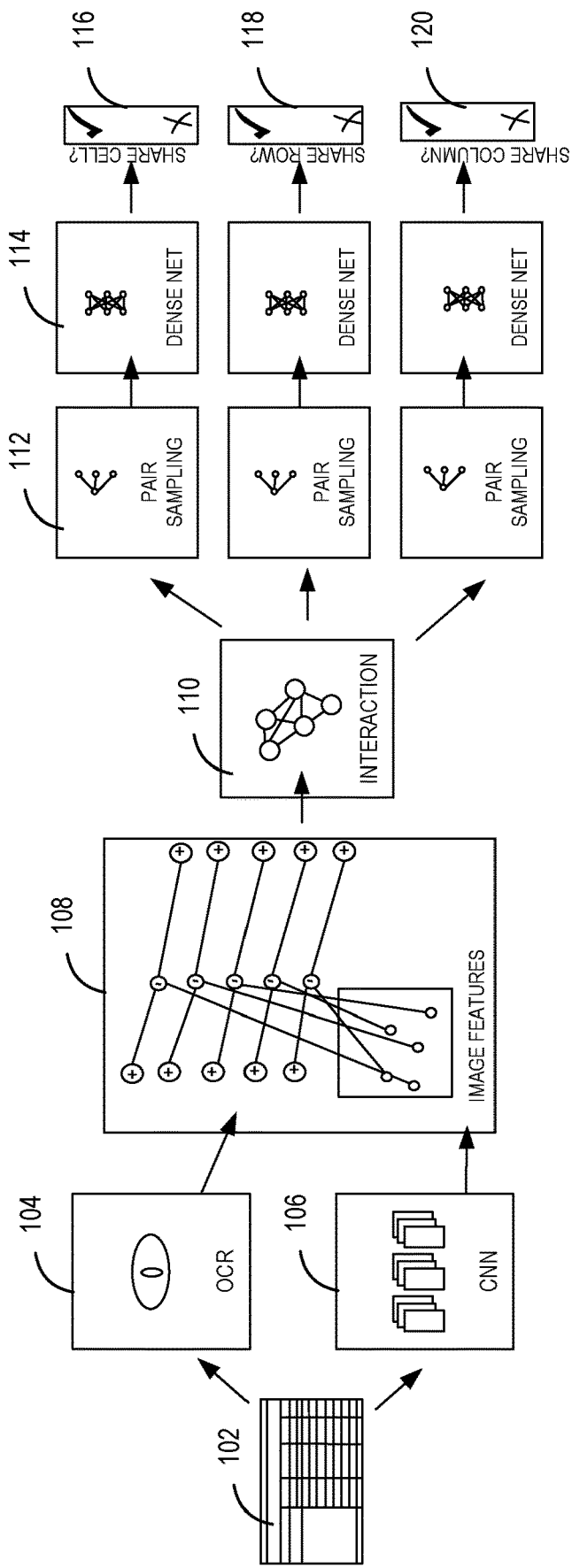
FIG. 1 is an example framework to apply optical character recognition to a table with cells, rows, and columns.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein "substantially real time" refers to occurrence in a near instantaneous manner recognizing there may be real world delays for computing time, transmission, etc. Thus, unless otherwise specified, "substantially real time" refers to real time +/−1 second. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

In certain jurisdictions, auditors and panelists involved in manual data collection may upload (e.g., record) receipts and invoices to an information collection entity (e.g., Nielsen Consumer, LLC). In some examples, there are at least two problems with the automatic decoding of the receipts and invoices (e.g., text) by traditional optical character recognition (OCR). The first problem is that the receipt may be wrinkled and/or deformed. The second problem is that based on the structure (e.g., format) of the receipt, there may be large gaps (e.g., large areas of empty space) between different data items (e.g., the item purchased, the price of the item, the product code, the taxes, etc.). Current computer vision solutions, due to the popularity of deep learning and Convolutional Neural Networks (CNNs), such as Faster R-CNN, Yolo, and dhSegment may be able to determine specific words of the text, but are unable to handle text with misalignment due to image and paper distortions. Example solutions disclosed herein improve text recognition in view of misalignment caused by image and paper distortions.

FIG. 1 is a prior art framework for performing OCR (e.g., application of OCR to a table). In particular, the illustrated example of FIG. 1 includes a graph neural network (GNN) architecture proposed for table recognition. The prior GNN architecture integrates aspects of a CNN for image features and integrates aspects of a GNN for structural linking. Table recognition includes three structural connections: rows, columns cells.

An input 102 of FIG. 1 is a feature representation of the words in the table. The positional features used in a feature representation vector 108 are the top left and bottom right points to represent the bounding box of the word provided by an example OCR process 104. An example CNN 106 is used to extract and then concatenate image features of the word to a feature representation vector 108. The feature representation vector 108 is utilized to represent each word as a vertex of a graph network 110. As a result, through pair sampling 112 and a dense net 114, the graph network 110 outputs a vertex adjacency matrix for each of the three structural connections to determine if words (i) share a cell 116, (ii) share a row 118, and/or (iii) share a column 120.

FIG. 2 illustrates the output after a maximal clique algorithm is applied to construct full cells 202, rows 204, and columns 206. In the illustrated example of FIG. 2, the text that had the OCR process performed (post-OCR text, OCRed text) was derived from a table with multiple cells, multiple rows, and multiple columns. The cells 202 illustrate how each word is in a separate clique of one (1). As used herein, a "clique" represents a graph where each vertex in the clique is connected to all the other vertices in the clique. For example, a clique may be a classification group or a first line, where all the words in the clique have a strong connection. For example, the words "IN NEED", "PILL PT", and "SANIDINE" are each highlighted in dashed lines. Row 204 illustrates how multiple words may belong to a single row of the table. For example, the words "446.00", "NORTH", "0.001", "TO", "04" "PILL, PT", and "SINCE" are in a first row. Example column 206 illustrates how multiple words may belong to a single column of the table. For example, the words "PRODUCTS", "EXERCISES", "TO", "BERKELEY", "ANIONS", "SANDINE", "LIABILITY UNREALIZED" are in a first column. The prior process to generate the cells, rows, columns, has been adapted to be used for text from receipts with large gaps between entries instead of orderly tables.

Figure 3:
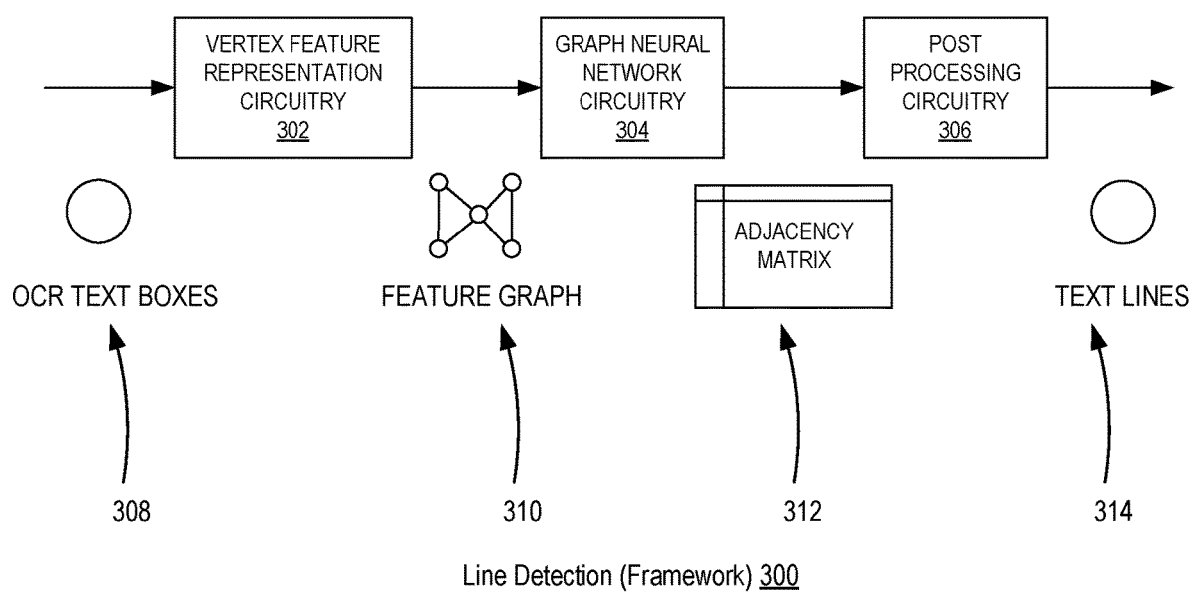
FIG. 3 is an example line detection framework to decode receipts.

FIG. 3 illustrates an example line detection framework 300 for decoding text (e.g., receipts, media with large gaps, media having distortions, etc.). The example line detection framework 300 includes at least three operations performed by circuitry: vertex feature representation circuitry 302, graph neural network circuitry 304, and post processing circuitry 306. Example input 308 for the vertex feature representation operation (e.g., step) (performed by the vertex feature representation circuitry 302) is OCRed text boxes. The vertex feature representation circuitry 302 uses the example OCRed text boxes 308 as an input, and produces an example feature graph 310 as an output. The example graph neural network circuitry 304 uses the example feature graph 310 as an input and generates an example adjacency matrix 312. The example post processing circuitry 306 uses the example adjacency matrix 312 as an input and generates text lines 314 having a corrected alignment with other text (e.g., words, corresponding numbers, etc.) that is relevant to a particular row (e.g., a row on a receipt showing an item description, a corresponding item quantity, a corresponding item price, etc.).

Figure 4:
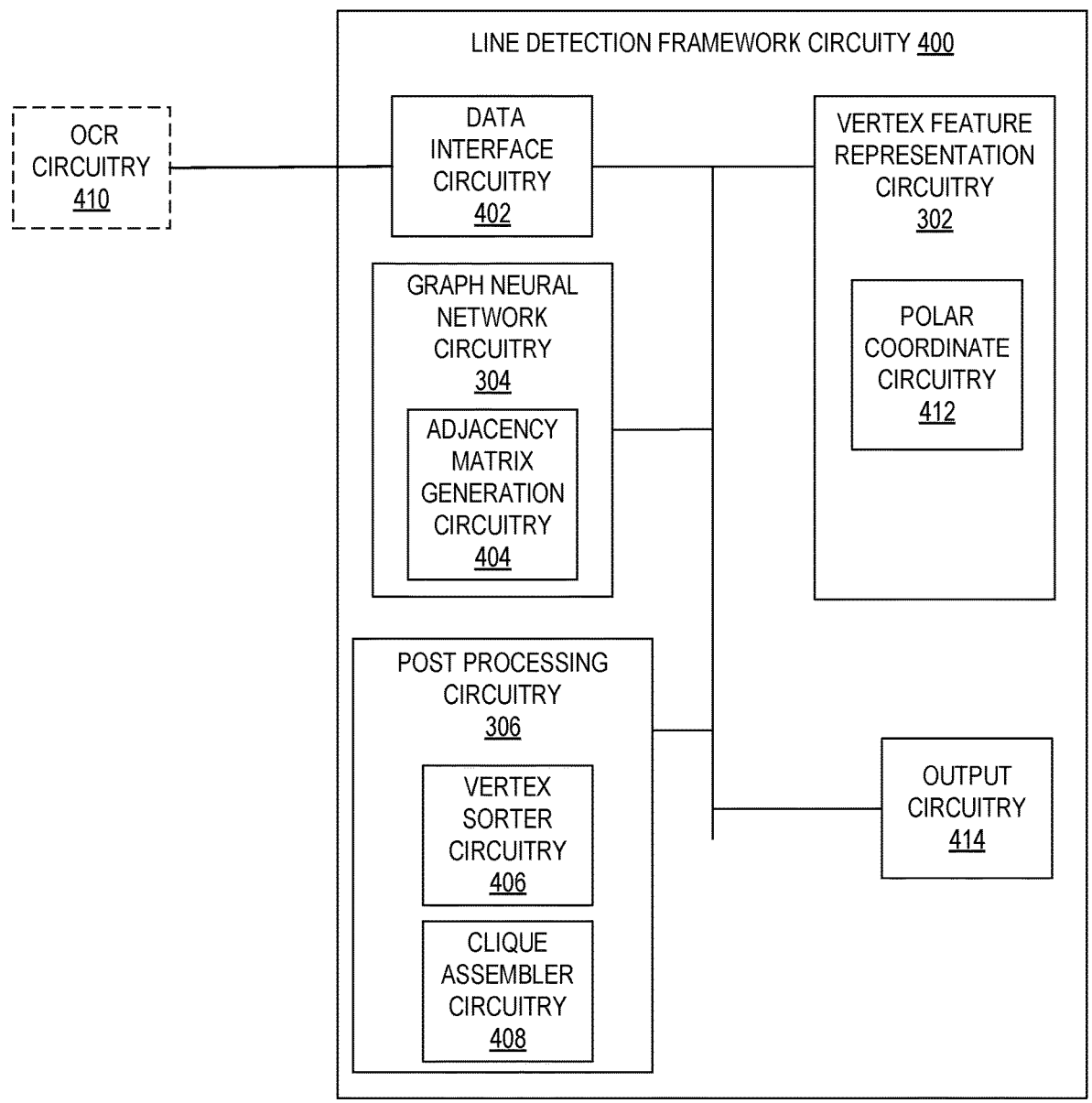
FIG. 4 is a block diagram of example line-detection framework circuitry corresponding to the example line detection framework of FIG. 3.

FIG. 4 is a block diagram of example line detection framework circuitry 400. In some examples, the line detection framework circuitry 400 of FIG. 4 implements the framework of FIG. 3. The example line detection framework circuitry 400 includes data interface circuitry 402, the vertex feature representation circuitry 302 of FIG. 3, polar coordinate circuitry 412, the graph neural network circuitry 304 of FIG. 3, adjacency matrix generation circuitry 404, the post-processing circuitry 306 of FIG. 3, vertex sorter circuitry 406, clique assembler circuitry 408, and optional OCR circuitry 410.

The example data interface circuitry 402 is to receive OCRed text boxes (e.g., the OCRed text boxes of FIG. 3) from, for instance, the OCR circuitry 410. In some examples, the OCR circuitry 410 is included in the line detection framework circuitry 400. The OCR circuitry 410 may be any standard OCR process (e.g., Google OCR). The example data interface circuitry 402 communicates the example OCRed text boxes to the example vertex feature representation circuitry 302.

Figure 6:
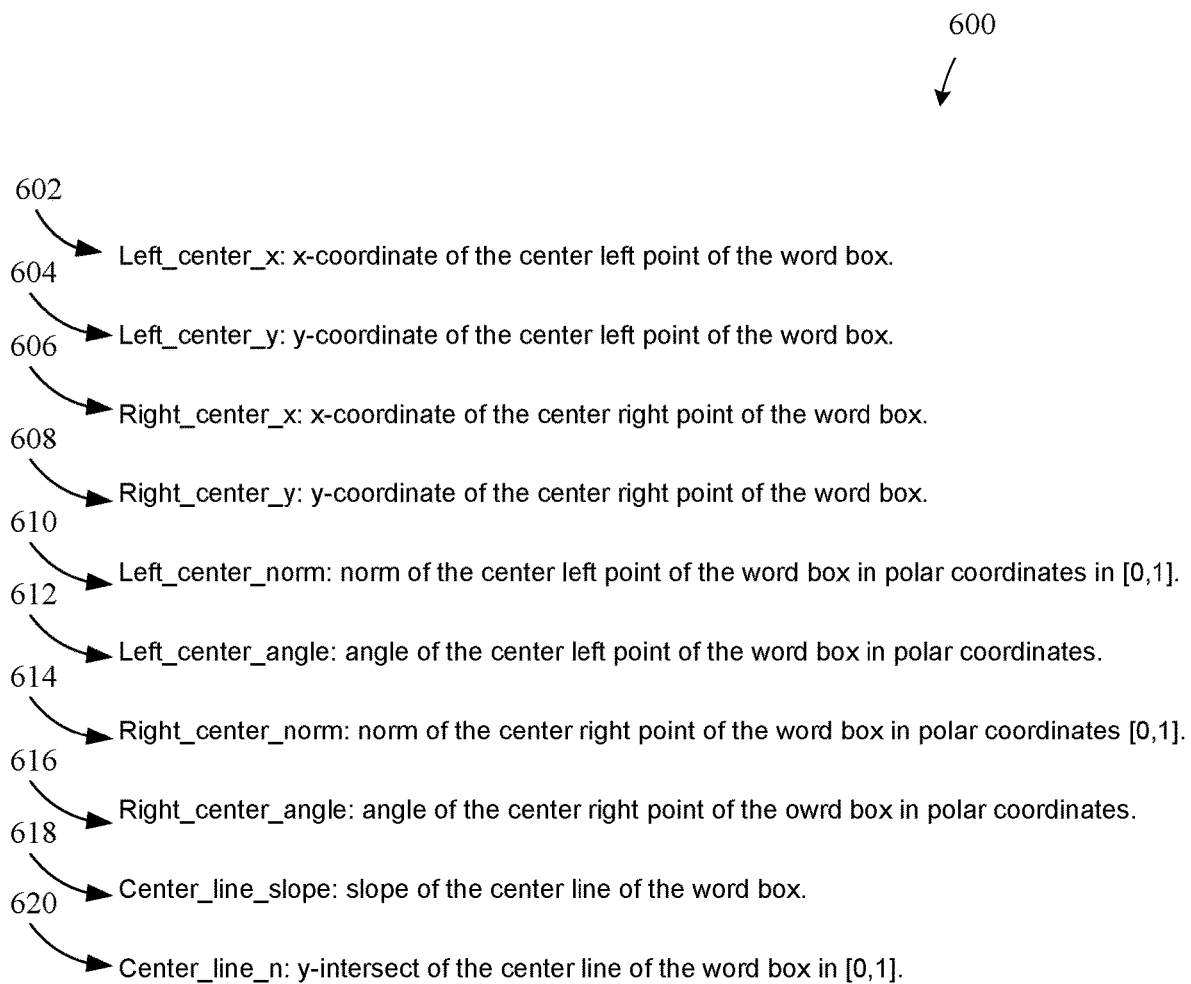
FIG. 6 illustrates example features recorded by an example feature vector representation circuitry.
Figure 7:
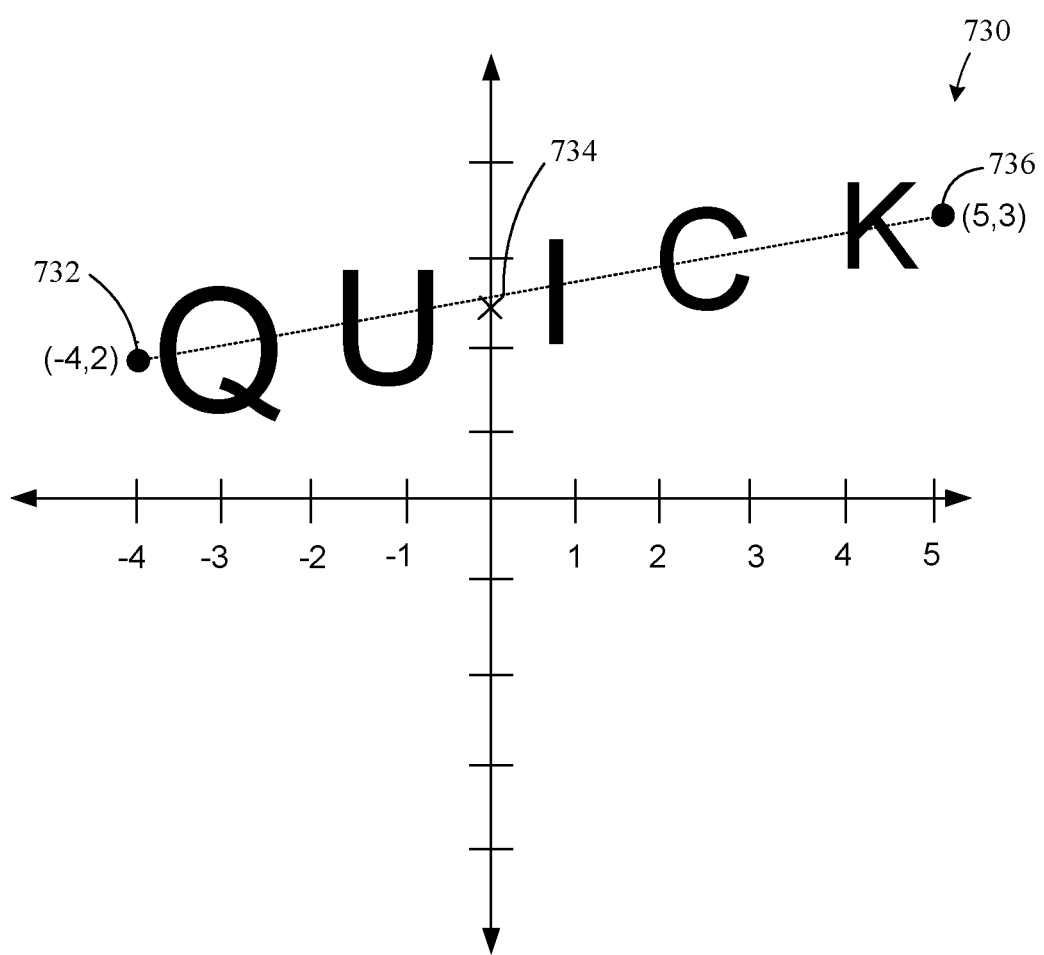
FIG. 7 illustrates an example word in context.
Figure 8:
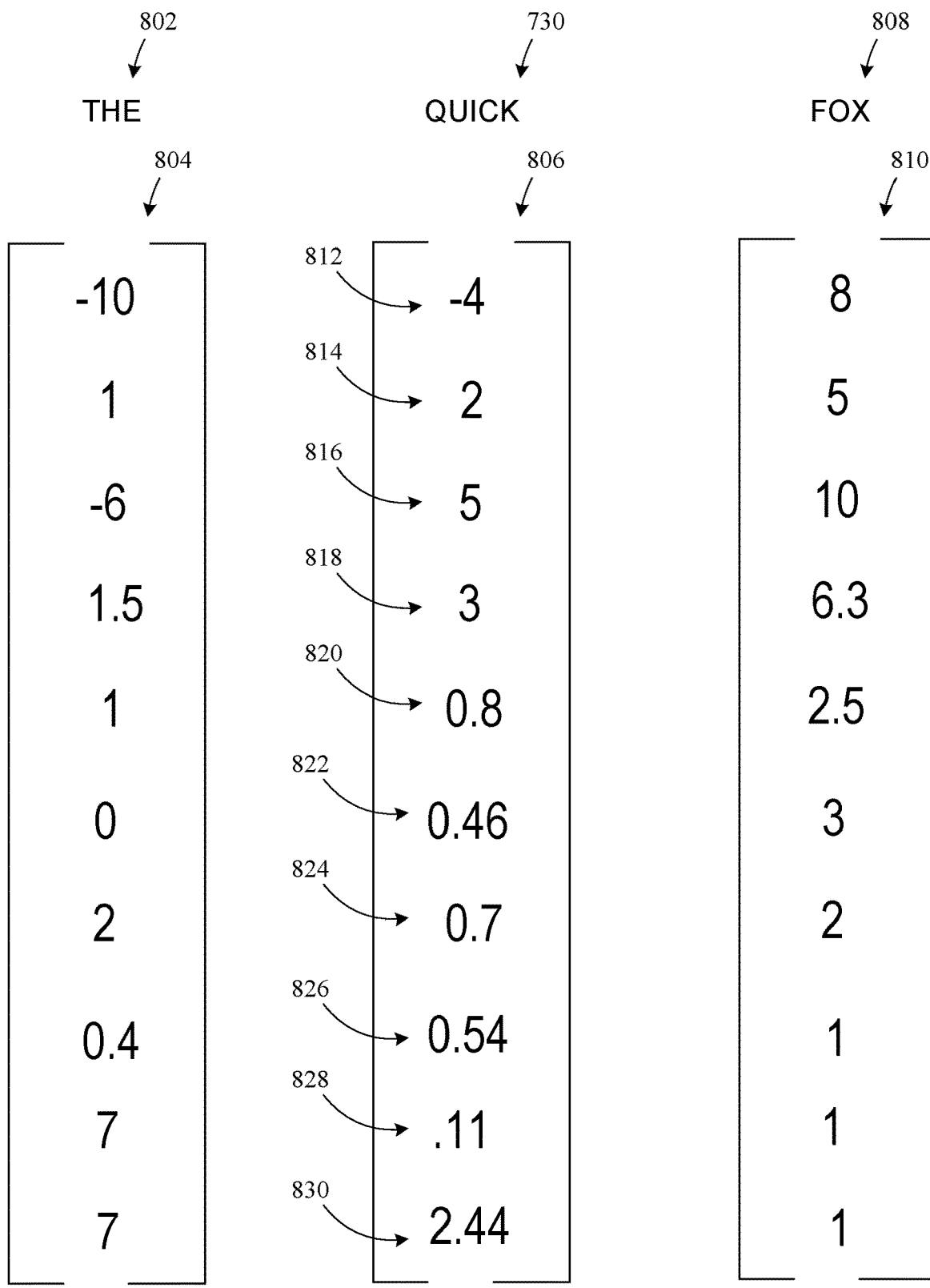
FIG. 8 illustrates an example vector corresponding to the example word of FIG. 7.

The example vertex feature representation circuitry 302 is to classify the data derived from the OCR into a vector corresponding to a vertex (e.g., neuron of the GNN). The example vertex feature representation circuitry 302 is to generate a vector of information (e.g., ten portions of data) corresponding to a single word. Typically, the OCR circuitry 410 (or the OCR process) generates cartesian coordinates for different points (e.g., locations) on the word. The example vertex feature representation circuitry 302 includes polar coordinate circuitry 412 which is to identify the polar coordinates of certain points (e.g., locations) on the word. FIGS. 6-8 are disclosed below with further details.

Figure 10:
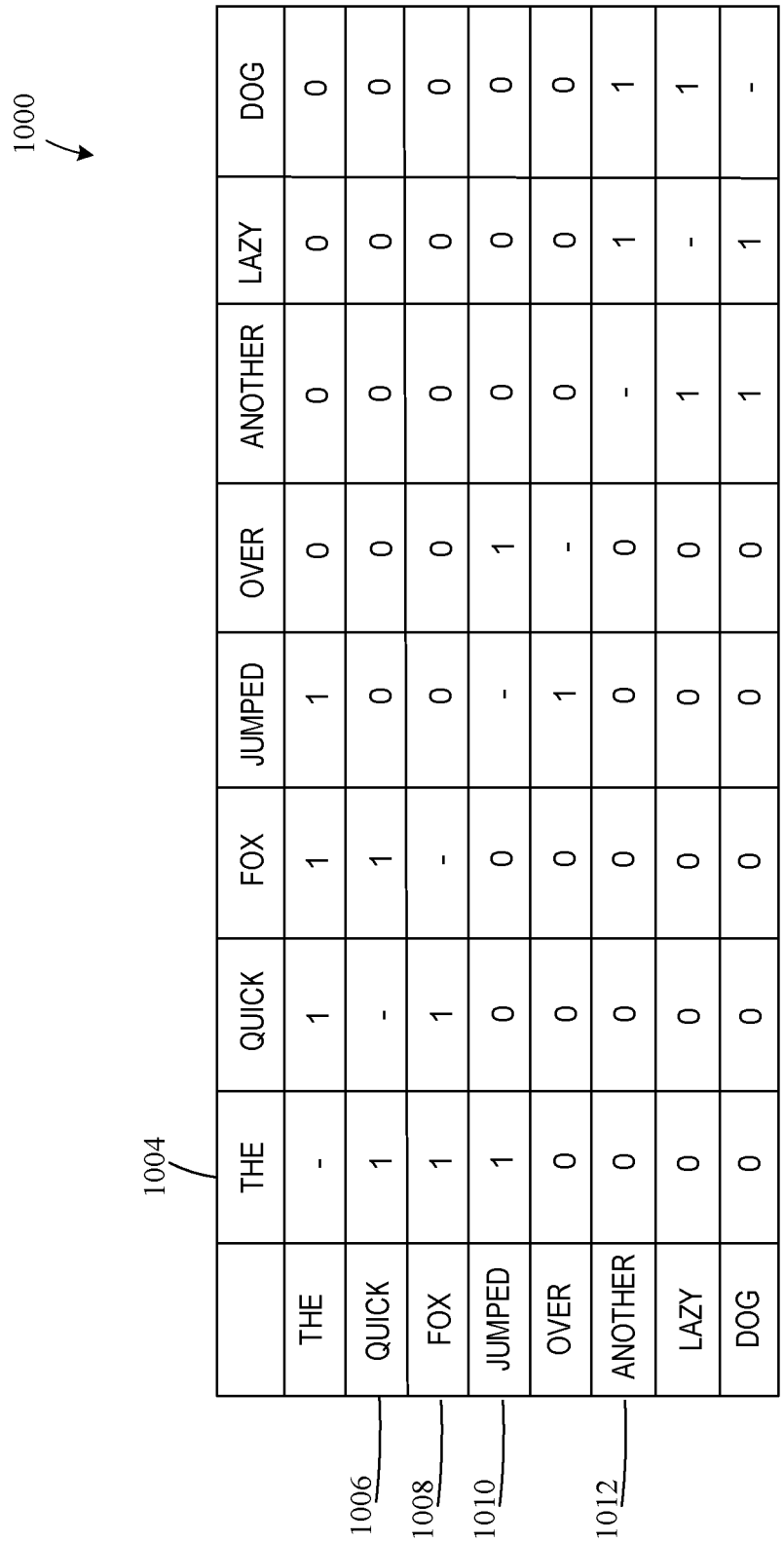
FIG. 10 is an example adjacency matrix corresponding to the example text of FIG. 9 and FIG. 5.

The example graph neural network circuitry 304 is to receive, retrieve and/or otherwise obtain vectors for the words, corresponding vertex feature representations (wherein the current data type is modeled as a vector) and the example adjacency matrix generation circuitry 404 generates an adjacency matrix (such as the example adjacency matrix of FIG. 10). The example graph neural network circuitry 304 executes and/or otherwise processes a graph neural network, wherein the neurons (e.g., nodes, vertices) are the different vectors corresponding the OCRed words. The example graph neural network circuitry 304 generates the adjacency matrix used by the example post-processing circuitry 306.

The example post-processing circuitry 306 includes example vertex sorter circuitry 406 and clique assembler circuitry 408. The example post-processing circuitry 306 generates lines of text for digital upload by determining not only which words are adjacent, but which words belong in the same clique (e.g., classification group) as the other words.

The example line detection framework circuitry 400 includes example output circuitry 414, wherein the output circuitry 414 outputs the maximum cliques as horizontal rows (e.g., lines of text).

Figure 5:
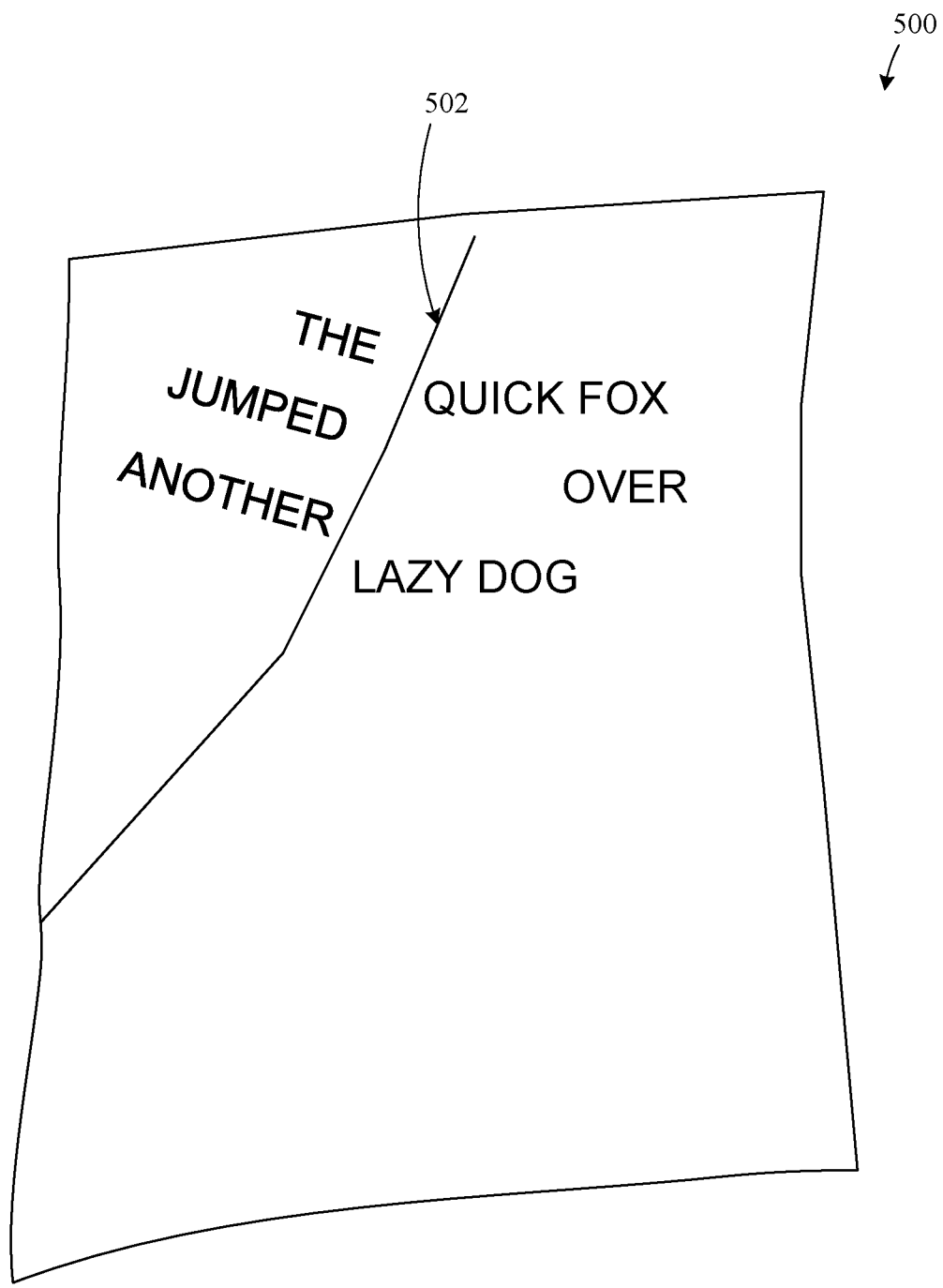
FIG. 5 illustrates an example wrinkled receipt with corresponding text to decode.

FIG. 5 is a visual illustration of example media (e.g., a piece of paper, a receipt, etc.) 500 to be decoded by the example line detection framework of FIG. 4. The illustrated example of FIG. 5 includes a wrinkle (e.g., a crease) 502. Due to the crease (e.g., misalignment, deformation, wrinkle, etc.), the text is not straight and/or otherwise horizontal (e.g., the wrinkle 502 causes a deviation from a horizontal line). While a human being may understand the sentence to read "THE QUICK FOX JUMPED OVER ANOTHER LAZY DOG," prior art OCR techniques may recognize the words of the text, but may not place the words in the correct lines or associations with each other. For example, the automatic OCR process may generate a sentence "THE JUMPED QUICK FOX ANOTHER LAZY DOG OVER." In the example of FIG. 5, there is an angular misalignment and a large gap between the words "JUMPED" and "OVER." In some media (e.g., receipts), there may be a large gap between the name of the product (e.g., milk) and the price of the product (e.g., $1.99). The example line detection framework circuitry 400 decodes the text on the receipt 500.

FIG. 6 is an example of computer syntax of example target feature data 600. For example, the OCR circuitry 410 of FIG. 4 may collect positional information of text boxes, which may be transmitted (e.g., communicated, sent) to the example data interface circuitry 402 of FIG. 4. The example vertex feature representation circuitry 302 generates (e.g., builds) a feature graph wherein each word of the text (e.g., each word of the document) is a vertex of the graph. Any number of vertex representations may be used by the vertex feature representation circuitry 302 to identify connections and/or spatial associations between the words of the text. The example target feature data 600 includes at least ten different data points. The vertex representation circuitry 302 selects and/or otherwise causes selection of the cartesian left center x coordinate 602 (e.g., "LEFT_CENTER_X") which is the x-coordinate of the center left point of the word box.

The vertex representation circuitry 302 selects and/or otherwise causes selection of the cartesian left center y coordinate 604 (e.g., "LEFT_CENTER_Y") which is the y-coordinate of the center left point of the word box.

The vertex representation circuitry 302 selects and/or otherwise causes selection of the cartesian right center x coordinate 606 (e.g., "RIGHT_CENTER_X") which is the x-coordinate of the center right point of the word box.

Figure 14:
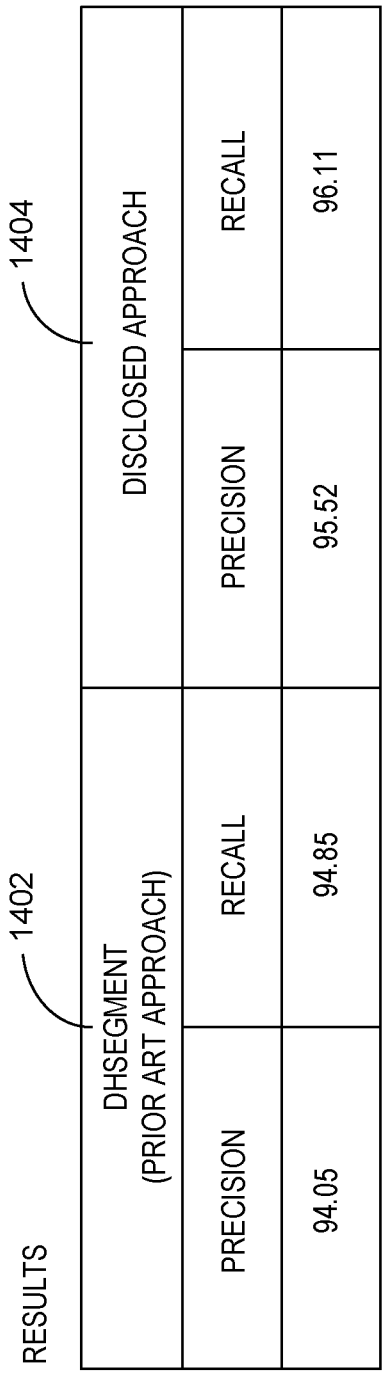
FIG. 14 is an example results table comparing the disclosed approach and the prior approach.

The vertex representation circuitry 302 selects and/or otherwise causes selection of the cartesian right center y coordinate 608 (e.g., RIGHT_CENTER_Y) which is the y-coordinate of the center right point of the word box. The aforementioned approach uses bounding boxes by selecting the top-left point and the bottom-right point, while the techniques disclosed herein utilize the center points on the left of the word and the right of the word to generate a center line. The techniques disclosed herein utilize the center points of the words which is more accurate than the prior technique of a bounding box. FIG. 14 is a comparison between the accuracy and/or precision of the two techniques for examples of media to be decoded. Representatives of five hundred ("500") images of CPS receipts are shown in FIGS. 15-18.

The example vertex representation circuitry 302 selects and/or otherwise causes selection of the norm of the left center point 610 (e.g., LEFT_CENTER_NORM) which is the norm of the center left point of the word box in polar coordinates in [0,1].

The vertex representation circuitry 302 selects and/or otherwise causes selection of the left center angle 612 (e.g., LEFT_CENTER_ANGLE) which is the angle of the center left point of the word box in polar coordinates.

The vertex representation circuitry 302 selects and/or otherwise causes selection of the right center norm 614 (e.g., RIGHT_CENTER_NORM) which is the norm of the center right point of the word box in polar coordinates [0,1].

The vertex representation circuitry 302 selects and/or otherwise causes selection of the right center angle 616 (e.g., RIGHT_CENTER_ANGLE) which is the angle of the center right point of the word box in polar coordinates. In some examples, the polar coordinate circuitry 412 generates the four polar coordinates (610, 612, 614, 616) by determining the norm and the angle of the left center point and the right point. The example polar coordinates include angular information which may contribute to complex misalignment problems (e.g., wrinkles, large gaps).

The vertex representation circuitry 302 selects and/or otherwise causes selection of the center line slope 618 (e.g., CENTER_LINE_SLOPE) which is the slope of the center line of the word box.

The vertex representation circuitry 302 selects and/or otherwise causes selection of the y intersect point 620 (e.g., CENTER_LINE_N) which is the y-intersect of the center line of the word box in [0,1]. The example slope 618 and y-intersect 620 join the left and right center points.

FIG. 7 is an example word 730 illustrating the different positional features selected by the example vertex representation circuitry 302. For example, the word 730 (e.g., "QUICK") has a left center point 732. The left center point includes an x-coordinate of negative four ("−4") and a y-coordinate of positive two ("2"). The right center point 736 includes an x-coordinate of positive five ("5") and a y-coordinate of positive three ("3"). The example word includes a y-intersect point 734 at a y-coordinate of two point forty-four ("2.44"). As shown in the example of FIG. 7, the center line cuts through the center of the example word 736, rather than the prior approach of surrounding the entire word in a bounding box.

FIG. 8 is an example representation of the data points corresponding to a word represented as a vector, which is used a vertex of the feature graph. The example word 802 (e.g., "THE") has a corresponding vector 804. The example word 730 (e.g., "QUICK") has a corresponding vector 806. The example word 808 (e.g., "FOX") has an example vector 810. The example vector 806 includes the ten data points of FIG. 6, but with information corresponding to the example word 732 of FIG. 7. For example, the left center x-coordinate data point value 812 is negative four ("−4") and the left center y-coordinate data point value 814 is positive two ("2"). (See the left center data point 732 of FIG. 7). FIG. 8 is an example, and the accuracy of the data points (e.g., the cartesian coordinates, the polar coordinates, the center line slope) is not guaranteed. The example vertex feature representation circuitry 302 uses each word, with corresponding ten features, as a vertex of a feature graph (e.g., the feature graph 310 of FIG. 3.) The feature graph is used as an input for the graph neural network circuitry 304 which generates an adjacency matrix that represents the connections between words that belong to the same line. For example, words with an index i and index j, A[i,j]=1 if those words belong to the same line and A[i,j]=0 if otherwise.

Figure 9:
FIG. 9 illustrates example text detected by examples disclosed herein.

FIG. 9 is the example text 900 to be decoded that corresponds to the adjacency matrix 1000 of FIG. 10. The example text in FIG. 9 is a sentence, having three lines, reading "THE QUICK FOX JUMPED OVER ANOTHER LAZY DOG." The first line 902 includes the first three words (e.g., "THE", "QUICK," "FOX"), the second line 904 includes the next two words (e.g., "JUMPED", "OVER"), and the third line 906 includes the last three words (e.g., "ANOTHER," "LAZY," "DOG."). The example text 900 may be the output of the example output circuitry 414, and is merely shown to illustrate the functionality of the adjacency matrix 1000 of FIG. 10.

FIG. 10 is an example adjacency matrix 1000. The example graph neural network circuitry 304 (of FIG. 4) utilizes the adjacency matrix generation circuitry 404 (of FIG. 4) to generate the adjacency matrix 1000. The example adjacency matrix lists each word of the text 900 against all the other words of the text. For example, the word "THE" 1004 is adjacent to the word "QUICK" 1006 as shown by the one ("1"). The word "THE" 1004 is also adjacent to the word "FOX" 1008 even though there is not a direct connection as shown by the one ("1"). The word "THE" 1004 is adjacent to the word "JUMPED" 1010, despite not being in the same horizontal line as shown by the one ("1"). The example post-processing circuitry 306 of FIG. 3 will address the issue that mere adjacency is not the same as being in the same line. In some examples, the word "THE" 1004 is not adjacent to the word "JUMPED" 1010 because the word "JUMPED" 1010 is not in the same horizontal line, and is shown by a zero ("1"). The word "THE" 1004 is not adjacent to the word "ANOTHER" 1012 as evidenced by the zero ("0").

The example post processing circuitry 306 traverses the adjacency matrix 1000 (the adjacency matrix 1000 generated by the graph neural network circuitry 304) in order to construct the text lines.

Figure 11:
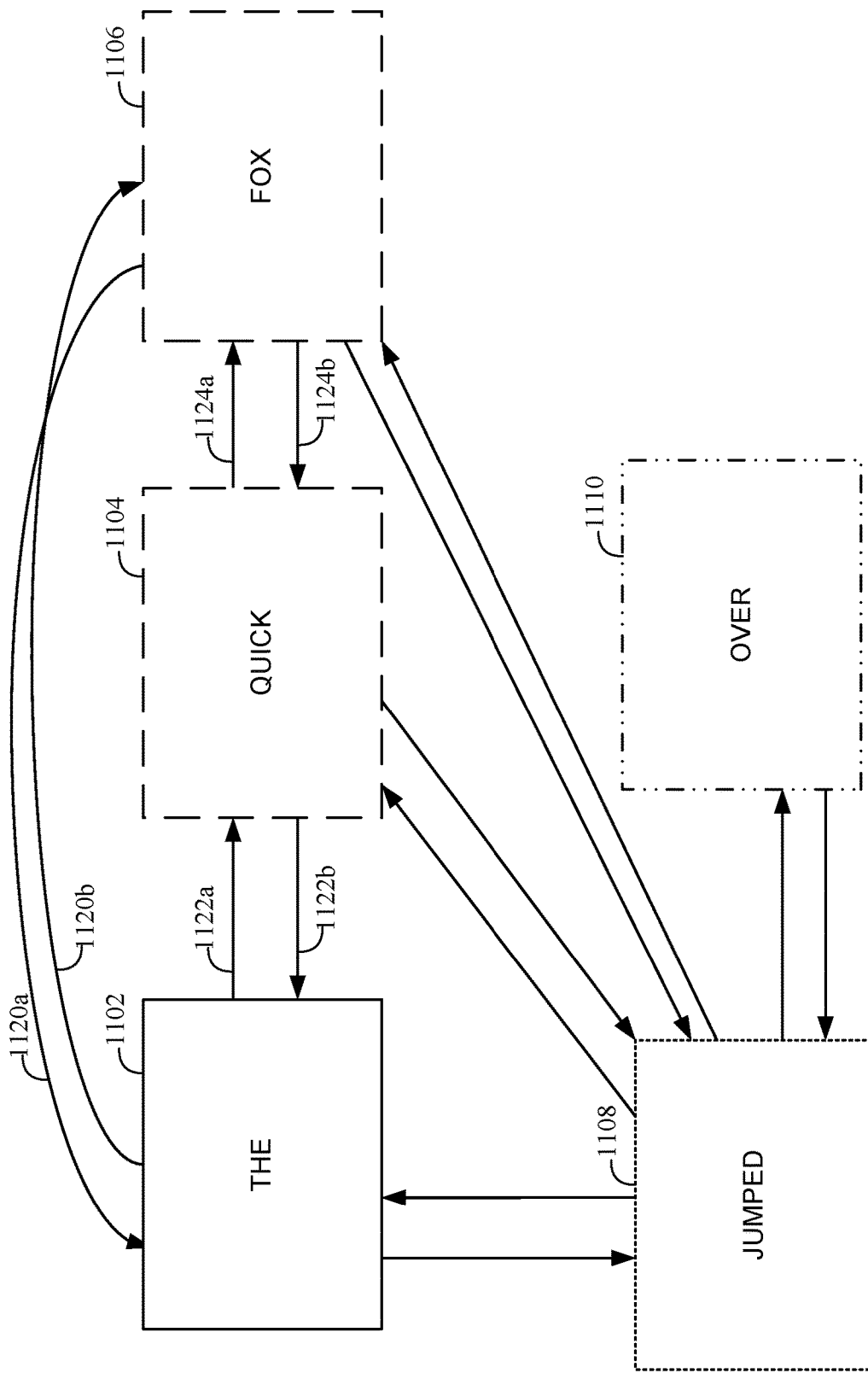
FIG. 11 illustrates an example post-processing algorithm.

FIG. 11 illustrates example operation/functionality of the example clique assembler circuitry 408 in line construction. The first word "THE" 1102 (in the black outlined box) is the reference word. The example clique assembler circuitry 408 determines there is a clique between the first word "THE" 1102 and the second word "QUICK" 1104 and the third word "FOX" 1106 (both in the dashed outlined boxes). The first word 1102, the second word 1104, and the third word 1106 are in a clique because there is a double connection between all three words. There is a first connection 1122a from the first word "THE" 1102 to the second word "QUICK" 1104. There is a second connection 1122b from the second work "QUICK" 1104 to the first word "THE" 1102. There is a second connection pair (1124a and 1124b) between the second word "QUICK" 1104 and the third word "FOX" 1106. There is a third connection pair (1120a and 1120b) between the first word 1102 and the third word 1106. As used herein, a double connection is wherein index i and index j, A[i,j]=1 if those words belong to the same line and A[i,j]=0 if otherwise.

Despite the fourth word "JUMPED" 1108 (in the dotted outline box) having double connections with the first word 1102, the second word 1104, the third word 1106, the fourth word 1108 is not included in the first clique. The clique assembler circuitry 406 operates according to the rule that a word that is below one of the words in the clique (e.g., line) is unable to be added to the left or right of the clique (e.g., line).

The fifth word "OVER" 1110 (in the dashed dotted outline box) does not belong to the first clique. The fifth word 1110 does not have connections to the words in the first clique (e.g., the first word 1102, the second word 1104, the third word 1106.

In some examples, the line detection framework circuitry 400 includes means for extracting features from optical-character-recognition (OCR) words. For example, the means for extracting features from OCR words may be implemented by vertex feature representation circuitry 302. In some examples, the vertex feature representation circuitry 302 may be implemented by machine executable instructions such as that implemented by at least blocks 1302, 1306 of FIG. 13 executed by processor circuitry, which may be implemented by the example processor circuitry 1912 of FIG. 19, the example processor circuitry 1900 of FIG. 19, and/or the example Field Programmable Gate Array (FPGA) circuitry 2000 of FIG. 20. In other examples, the vertex feature representation circuitry 302 is implemented by other hardware logic circuitry, hardware implemented state machines, and/or any other combination of hardware, software, and/or firmware. For example, the vertex feature representation circuitry 302 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the line detection framework circuitry 400 includes means for calculating polar coordinates of the OCR words. For example, the means for calculating polar coordinates of the OCR words may be implemented by polar coordinate circuitry 412. In some examples, the polar coordinate circuitry 412 may be implemented by machine executable instructions such as that implemented by at least blocks 1304 of FIG. 13 executed by processor circuitry, which may be implemented by the example processor circuitry 1912 of FIG. 19, the example processor circuitry 1900 of FIG. 19, and/or the example Field Programmable Gate Array (FPGA) circuitry 2000 of FIG. 20. In other examples, the vertex feature representation circuitry 302 is implemented by other hardware logic circuitry, hardware implemented state machines, and/or any other combination of hardware, software, and/or firmware. For example, the vertex feature representation circuitry 302 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the line detection framework circuitry 400 includes means for generating an adjacency matrix. For example, the means for generating an adjacency matrix may be implemented by adjacency matrix generation circuitry 404. In some examples, the adjacency matrix generation circuitry 404 may be implemented by machine executable instructions such as that implemented by at least blocks 1308 of FIG. 13 executed by processor circuitry, which may be implemented by the example processor circuitry 1912 of FIG. 19, the example processor circuitry 1900 of FIG. 19, and/or the example Field Programmable Gate Array (FPGA) circuitry 2000 of FIG. 20. In other examples, the adjacency matrix generation circuitry 404 is implemented by other hardware logic circuitry, hardware implemented state machines, and/or any other combination of hardware, software, and/or firmware. For example, the adjacency matrix generation circuitry 404 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the line detection framework circuitry 400 includes means for generating cliques of OCR words. For example, the means for generating cliques of OCR words may be implemented by clique assembler circuitry 408. In some examples, the clique assembler circuitry 408 may be implemented by machine executable instructions such as that implemented by at least blocks 1310 of FIG. 13 executed by processor circuitry, which may be implemented by the example processor circuitry 1912 of FIG. 19, the example processor circuitry 1900 of FIG. 19, and/or the example Field Programmable Gate Array (FPGA) circuitry 2000 of FIG. 20. In other examples, the clique assembler circuitry 408 is implemented by other hardware logic circuitry, hardware implemented state machines, and/or any other combination of hardware, software, and/or firmware. For example, the clique assembler circuitry 408 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the line detection framework circuitry 400 includes means for outputting lines of text based on the cliques of OCR words. For example, the means for outputting lines of text based on the cliques of OCR words may be implemented by output circuitry 414. In some examples, the output circuitry 414 may be implemented by machine executable instructions such as that implemented by at least blocks 1312 of FIG. 13 executed by processor circuitry, which may be implemented by the example processor circuitry 1912 of FIG. 19, the example processor circuitry 1900 of FIG. 19, and/or the example Field Programmable Gate Array (FPGA) circuitry 2000 of FIG. 20. In other examples, the output circuitry 414 is implemented by other hardware logic circuitry, hardware implemented state machines, and/or any other combination of hardware, software, and/or firmware. For example, the output circuitry 414 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

While an example manner of implementing the line detection framework circuitry 400 of FIG. 4 is illustrated in FIG. 4, one or more of the elements, processes, and/or devices illustrated in FIG. 4 may be combined, divided, re-arranged, omitted, eliminated, and/or implemented in any other way. Further, the example vertex feature representation circuitry 302, the example graph neural network circuitry 304, the example post processing circuitry 306, the data interface circuitry 402, the example adjacency matrix generation circuitry 404, the example vertex sorter 406, the example clique assembler circuitry 408, the example polar coordinate circuitry 412, and the example output circuitry 414, and/or, more generally, the example line detection framework circuitry 400 of FIG. 4, may be implemented by hardware, software, firmware, and/or any combination of hardware, software, and/or firmware. Thus, for example, any of the example vertex feature representation circuitry 302, the example graph neural network circuitry 304, the example post processing circuitry 306, the data interface circuitry 402, the example adjacency matrix generation circuitry 404, the example vertex sorter 406, the example clique assembler circuitry 408, the example polar coordinate circuitry 412, and the example output circuitry 414 and/or, more generally, the example line detection framework circuitry 400, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example vertex feature representation circuitry 302, the example graph neural network circuitry 304, the example post processing circuitry 306, the data interface circuitry 402, the example adjacency matrix generation circuitry 404, the example vertex sorter 406, the example clique assembler circuitry 408, the example polar coordinate circuitry 412, and/or the example output circuitry 414 is/are hereby expressly defined to include a non-transitory computer readable storage device or storage disk such as a memory, a digital versatile disk (DVD), a compact disk (CD), a Blu-ray disk, etc., including the software and/or firmware. Further still, the example line detection framework circuitry 400 of FIG. 4 may include one or more elements, processes, and/or devices in addition to, or instead of, those illustrated in FIGS. 12-13, and/or may include more than one of any or all of the illustrated elements, processes and devices.

Figure 12:
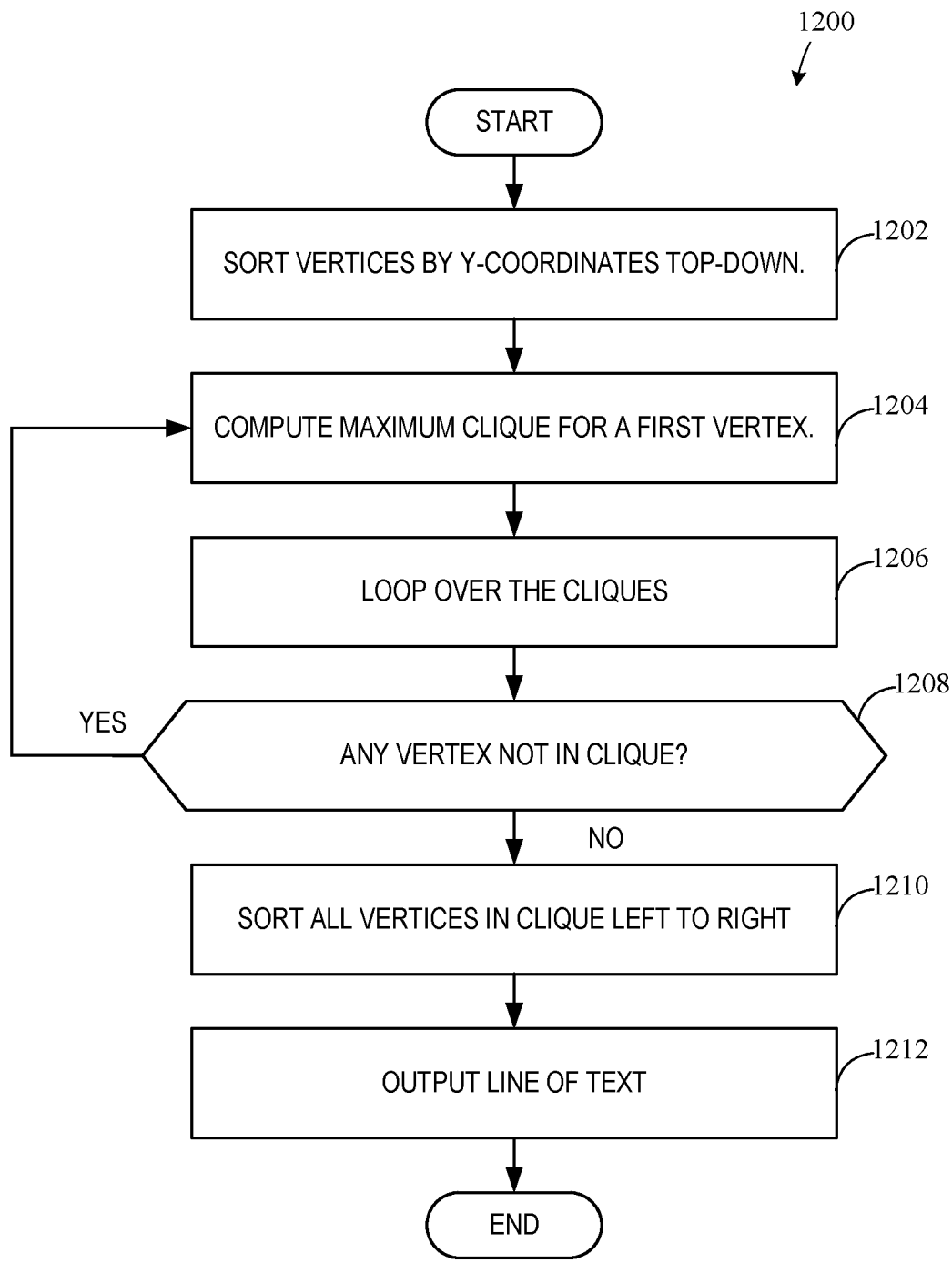
FIGS. 12-13 are flowcharts representative of example machine readable instructions that may be executed by example processor circuitry to implement the line detection framework circuitry disclosed herein.
Figure 13:
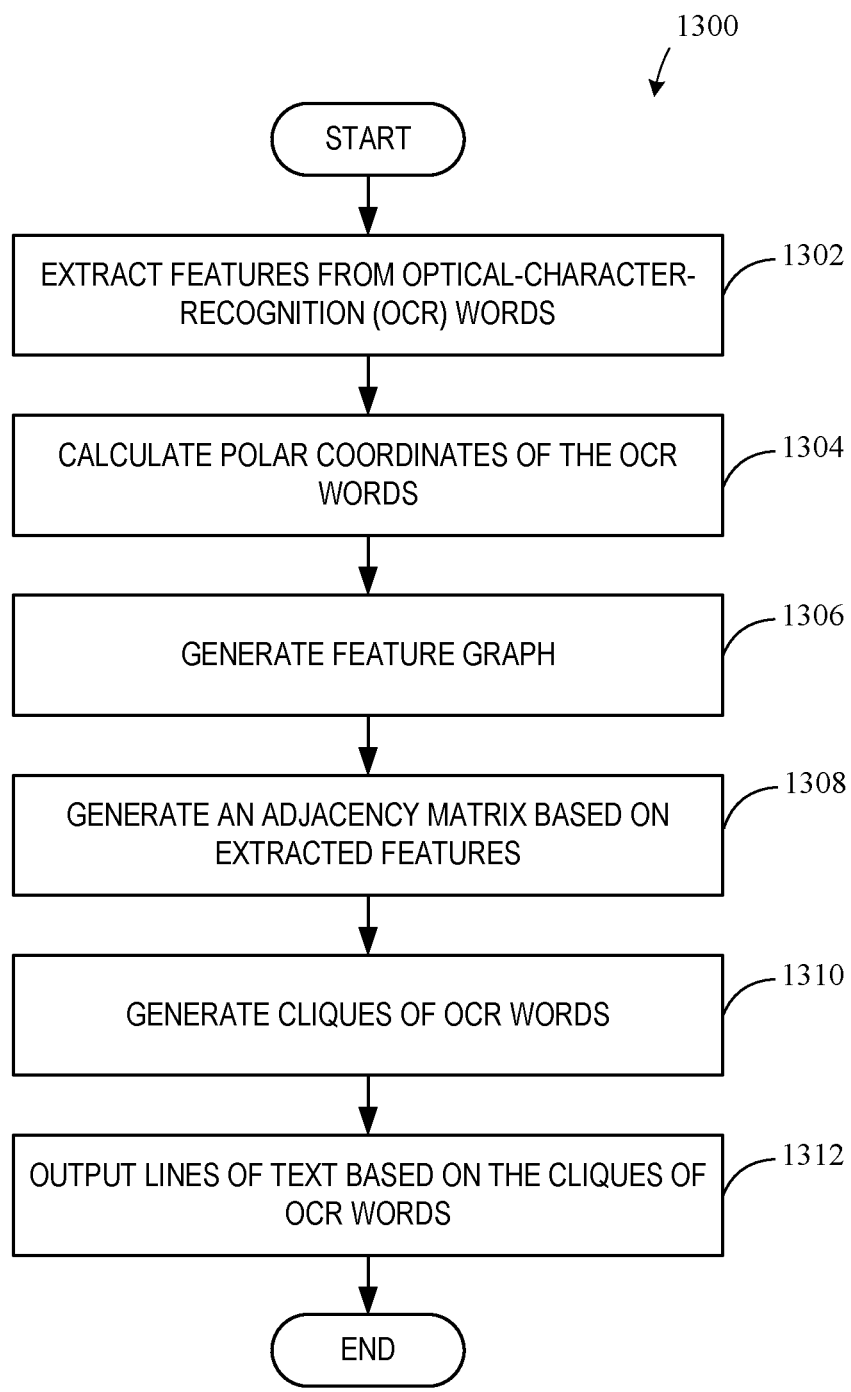

A flowchart representative of example hardware logic circuitry, machine readable instructions, hardware implemented state machines, and/or any combination thereof for implementing the line detection framework circuitry 400 of FIG. 3 is shown in FIGS. 12-13. The machine readable instructions may be one or more executable programs or portion(s) of an executable program for execution by processor circuitry, such as the processor circuitry 1912 shown in the example processor platform 1900 discussed below in connection with FIG. 19 and/or the example processor circuitry discussed below in connection with FIGS. 20 and/or 21. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIGS. 12-13, many other methods of implementing the example line detection framework circuitry 400 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 12-13 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 12 is a flowchart representative of example machine readable instructions and/or example operations 1200 that may be executed and/or instantiated by processor circuitry to output lines of text from the adjacency matrix. The machine readable instructions and/or operations 1200 of FIG. 12 begin at block 1202, at which the vertex sorter circuitry 406 sorts vertices by the y-coordinate from top to bottom. For example, the vertex sorter circuitry 406 may sort the vertices (e.g., words) by the y-coordinate from top to bottom by using the vertex with the largest positive y-coordinate as the first. For example, the first word 1102 has a y-coordinate that placed the first word 1102 above the y-coordinate of the fourth word 1108.

At block 1204, the clique assembler circuitry 408 computes the maximum clique for a first vertex. For example, the clique assembler circuitry 408 may compute the maximum clique for a first vertex by determining if there is a strong connection between the vertexes of the clique. For example, a strong connection may be defined as $A[i,j]=A[j,i]=1$. The example clique assembler circuitry 408 may determine vertexes to be in the clique if the vertex is to the left or right of all nodes (e.g., other vertices) in the clique.

At block 1206, the clique assembler circuitry 408 loops over the cliques. For example, the clique assembler circuitry 408 may loop over the cliques from top to bottom and retain disjoint cliques as the lines from top to bottom.

At block 1208, the clique assembler circuitry 408 determines if there is any vertex which is not in a clique. For example, the example clique assembler circuitry 408 may determine there is a vertex which is not in a clique (e.g., "YES"), control returns to block 1204. For example, the example clique assembler circuitry 408 may determine all the vertices are in a clique (e.g., "NO"), control advances to block 1210.

At block 1210, the example vertex sorter circuitry 406 sorts all the vertices in the clique from left to right. For example, the example vertex sorter circuitry 406 may sort all the vertices in the clique from left to right by using the x-coordinates of the vertices. For example, the first word 1102 of FIG. 11 is to the left of the second word 1104 of FIG. 11 based on the x-coordinates.

At block 1212, the example output circuitry 414 outputs a line of text. For example, the example output circuitry 414 may output a line of text by printing the words of the clique which have been sorted from left to right, and top to bottom.

FIG. 13 is a flowchart representative of example machine readable instructions and/or example operations 1200 that may be executed and/or instantiated by processor circuitry to output lines of text from the adjacency matrix. The example instructions and/or operations 1200 begin at block 1302, at which vertex feature representation circuitry 302 extracts features from optical-character-recognition (OCR) words. For example, the vertex feature representation circuitry 302 may extract features from OCR words by determining cartesian coordinates of the OCR words.

At block 1304, the example polar coordinate circuitry 412 calculates polar coordinates of the OCR words. For example, the example polar coordinate circuitry 412 may calculate the polar coordinates of the OCR words by determining the norm and the angle of the left center point and the right center point.

At block 1306, the example vertex feature representation circuitry 302 generates a feature graph. For example, the example vertex feature representation circuitry 302 may generate a feature graph based on the extracted features.

At block 1308, the example graph neural network circuitry 304 generates an adjacency matrix based on the extracted features. For example, the graph neural network circuitry 304 may generate an adjacency matrix based on the extracted features by using the feature graph as an input.

At block 1310, the example clique assembler circuitry 408 generates cliques of OCR words. For example, the example clique assembler circuitry 408 may generate a clique of OCR words by determining the number of connections the words have to other words. For example, a strong connection may be wherein for an index i and an index j, $A[i,j]=1$ if those words belong to the same line and $A[i,j]=0$ if otherwise.

At block 1312, the example output circuitry 306 outputs lines of text based on the cliques of the OCR words. For example, the example output circuitry 306 may output lines of text by sorting the cliques of OCR words and representing each clique as a distinct line of text. The example instructions 1300 end.

FIG. 14 is a results table example results table comparing the disclosed approach and the prior approach is a comparison between the accuracy and/or precision of the two techniques for examples of media to be decoded. Four representatives of the five hundred ("500") images of CPS receipts are shown in FIGS. 15-18. Examples disclosed herein have several benefits including more precision and more accuracy. The prior dhSegment approach 1402 has a corresponding precision of 94.05 and a recall of 94.85. The disclosed approach 1404 has a precision of 95.52 and a recall of 96.11.

Figure 15:
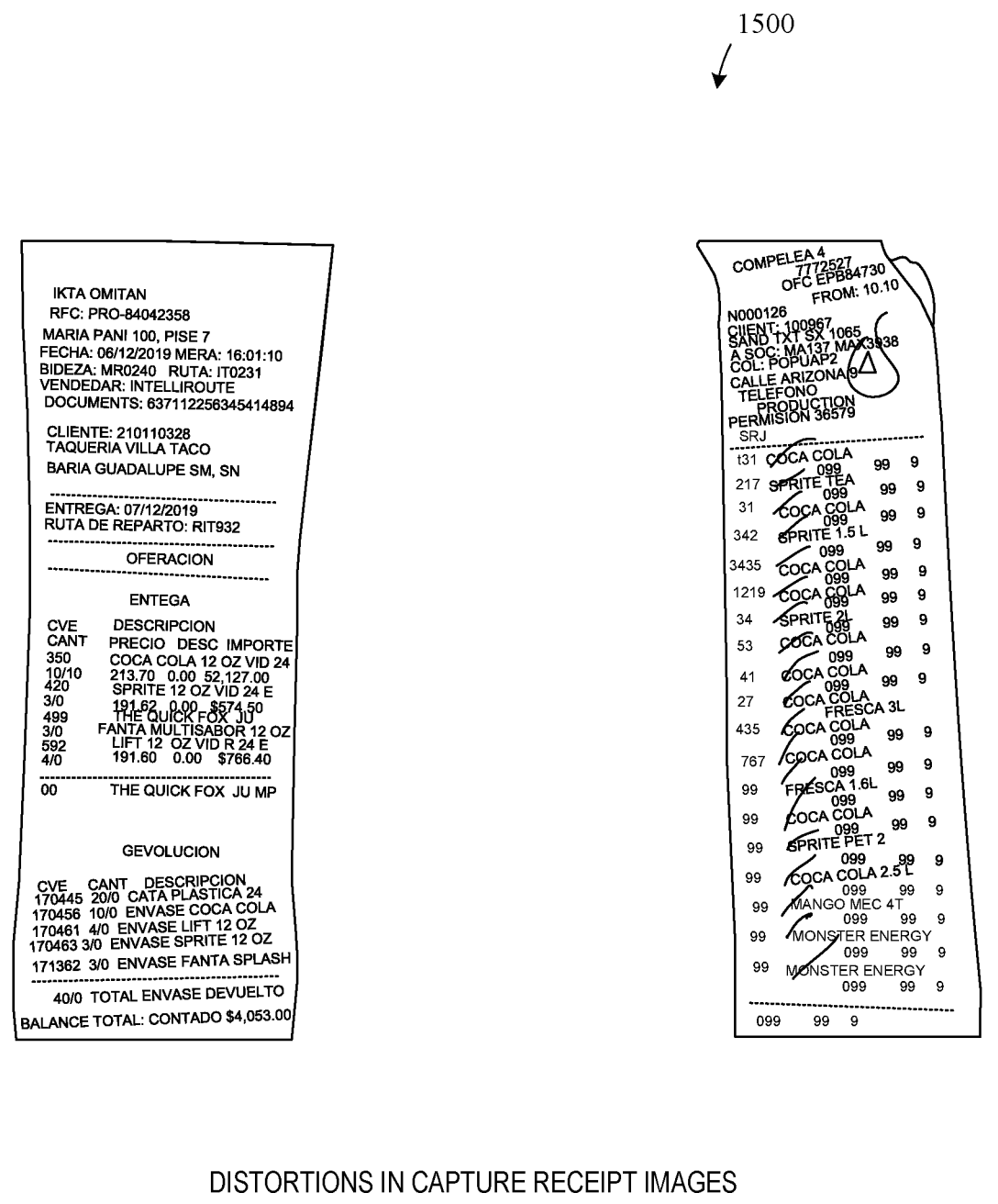

FIG. 15 illustrates typical distortions 1500 in receipt images. There may be wrinkles, creases, or misalignments.

Figure 16:
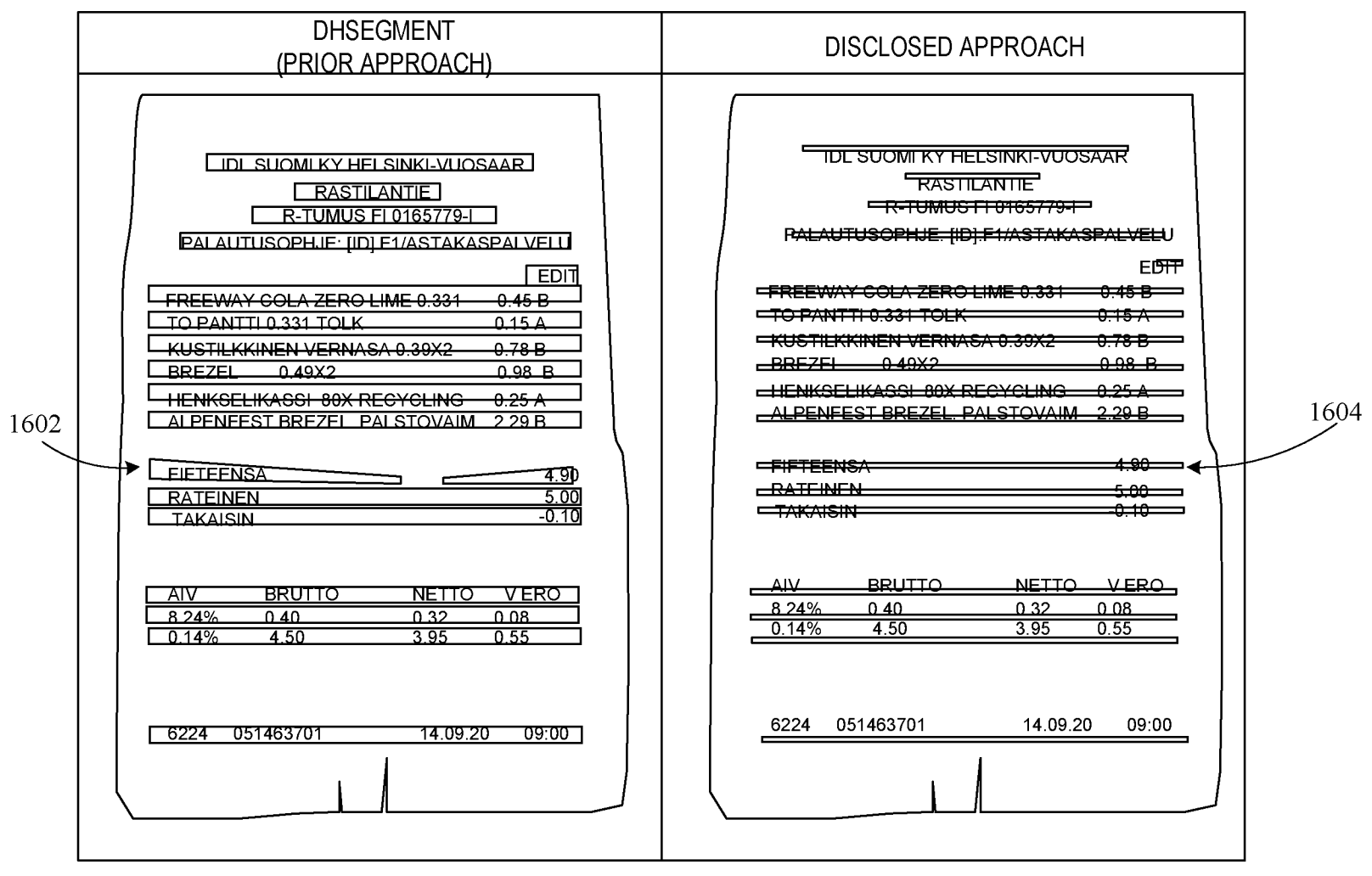

FIG. 16 illustrates the bounding boxes technique 1602 of one prior approach (e.g., dhSegment) contrasted with the center line technique 1604 disclosed herein. The product "FIFTEENSA" costs four dollars and ninety cents (e.g., 4.90). Under the bounding boxes 1602 a first box surrounds (e.g., bounds) the FIFTEENSA product and a second box surrounds (e.g., bounds) the price 4.90. Under the bounding boxes approach, the price is not linked with the product. Under the center line technique 1604, which travels through the center (e.g., middle) of the product and price, the product is linked to the price semantically. The large gap which causes the bounding boxes technique 1602 to incorrectly report the data, does not affect the center line technique 1604.

Figure 17:
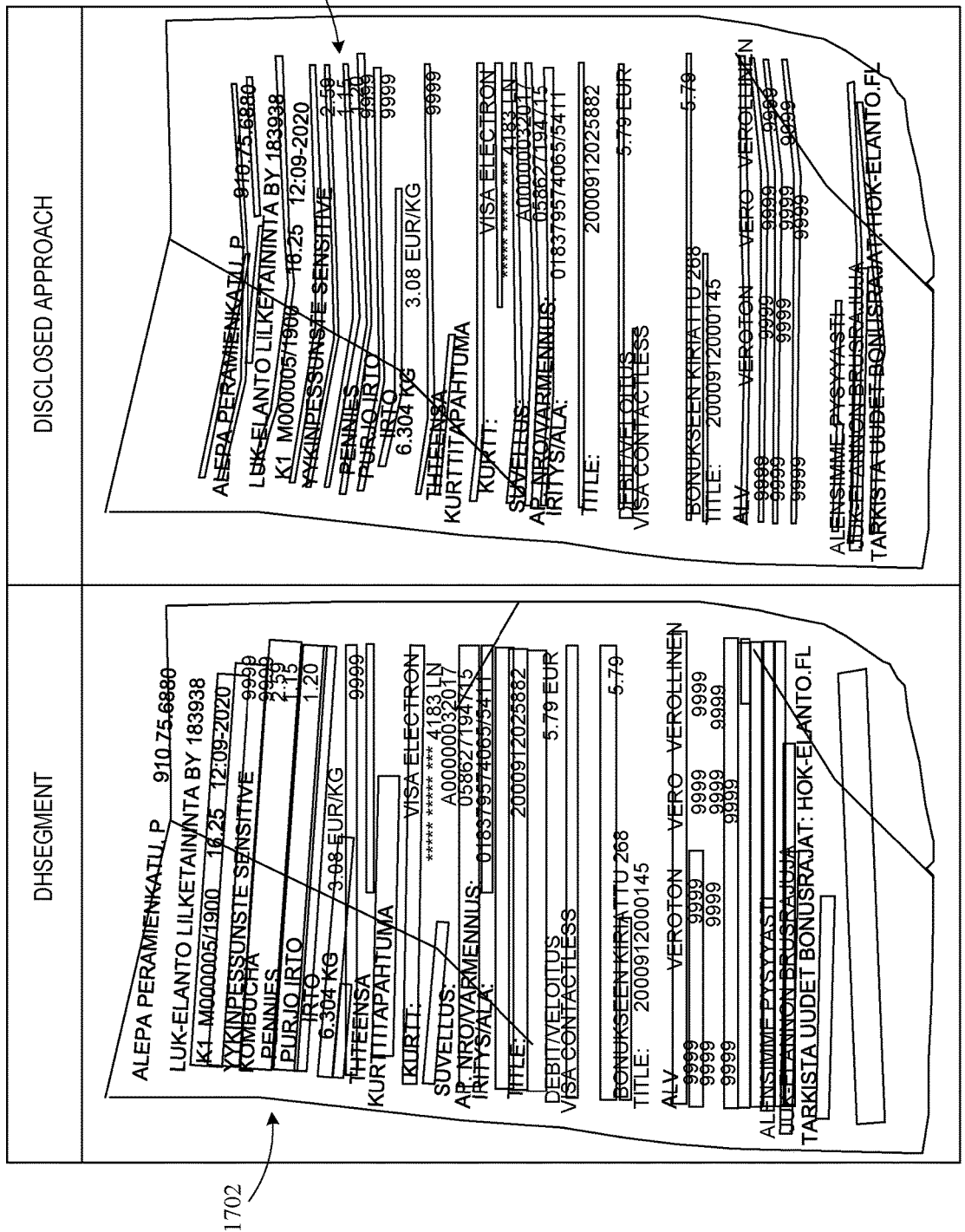

FIG. 17 illustrates the bounding boxes technique 1702 and the center line technique 1704 on a wrinkled and/or deformed receipt. The bounding boxes technique 1702 surrounds multiple numbers 2.59 and 1.15, while the center line technique 1704 has a first center line through the first number 2.59 and a second center line through the second number 1.15.

Figure 18:
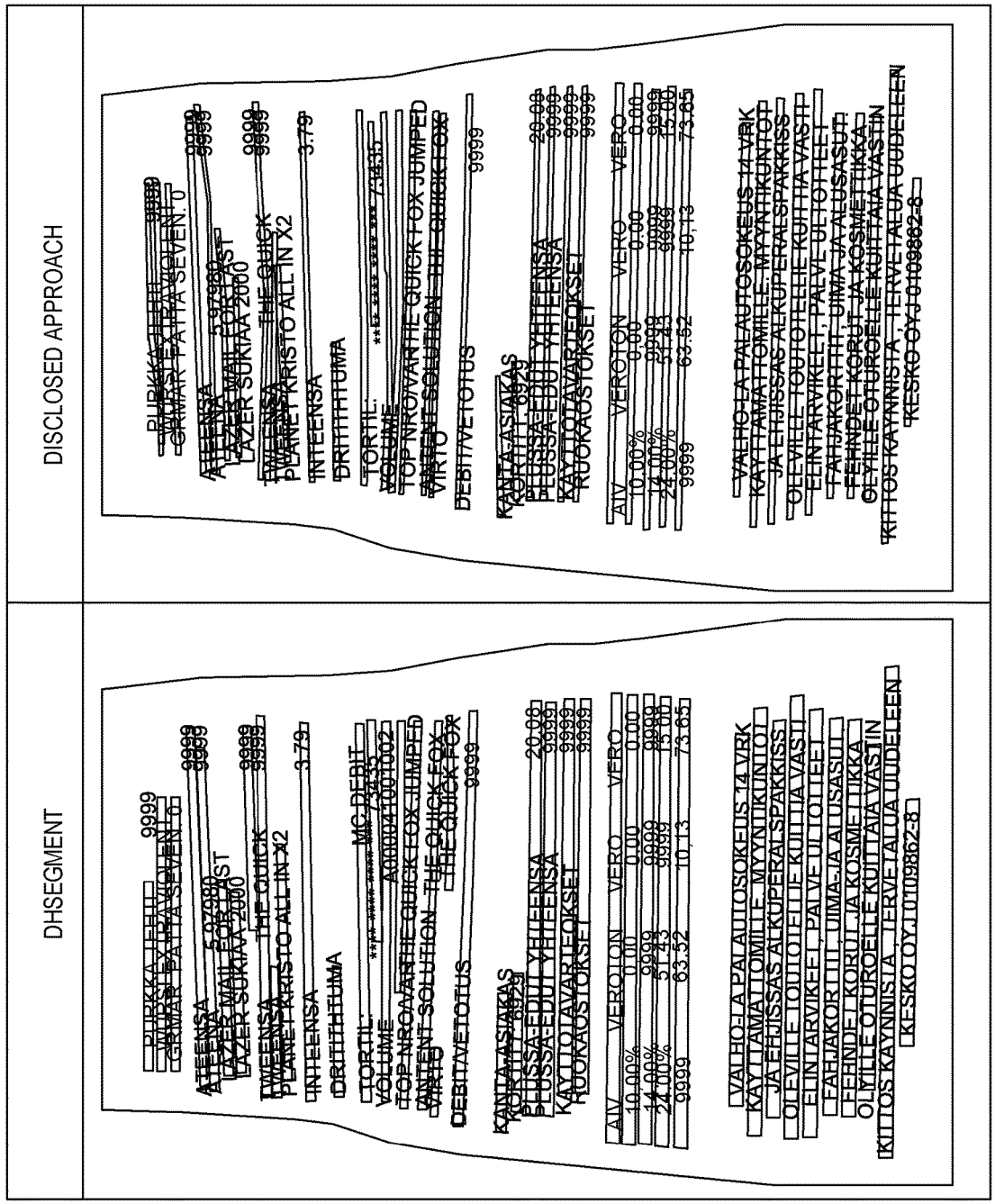

FIG. 18 illustrates a difficult receipt where both the prior art method and the disclosed method were inaccurate.

Figure 19:
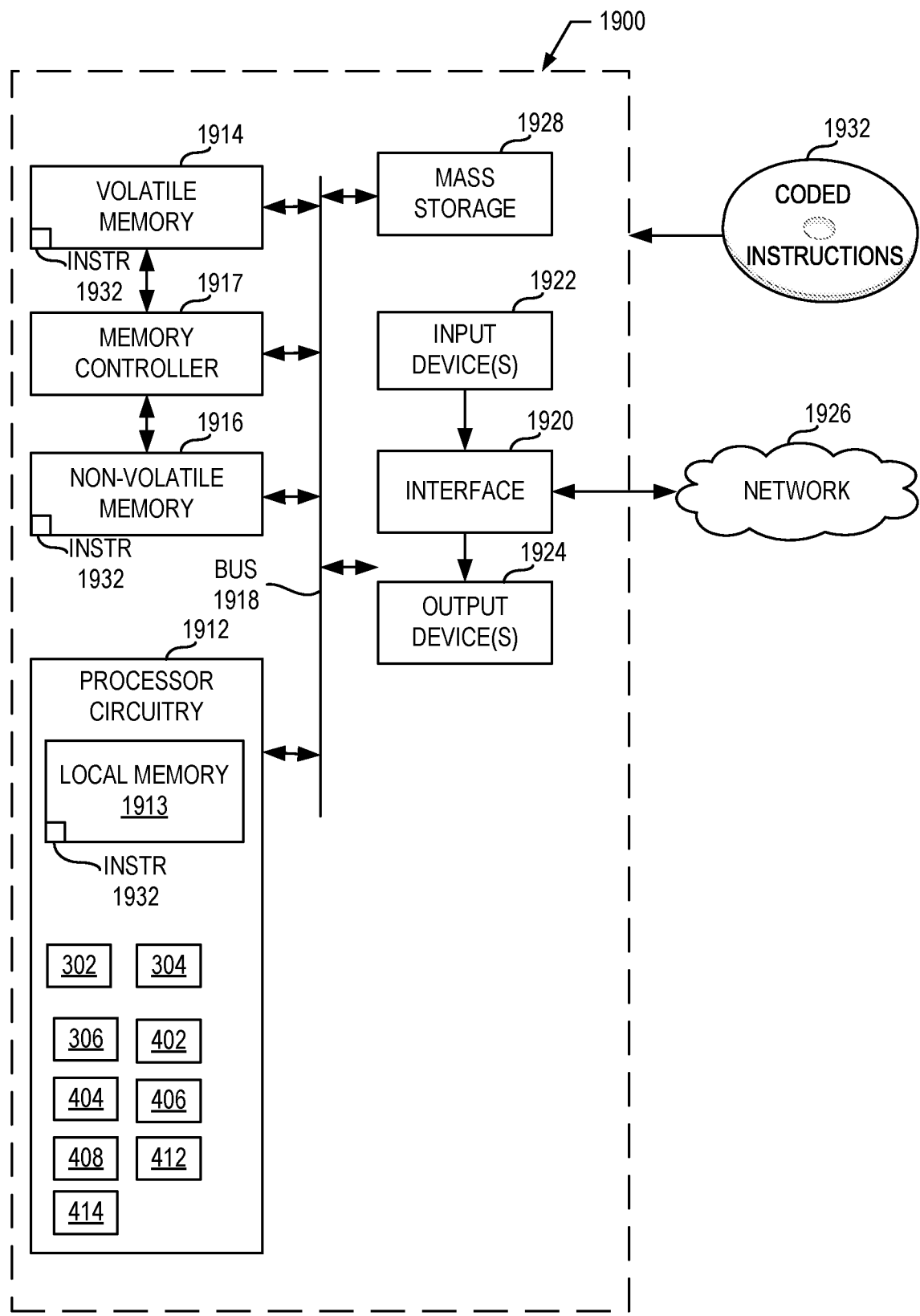
FIG. 19 is a block diagram of an example processing platform including processor circuitry structured to execute the example machine readable instructions of FIGS. 12-13 to implement the example line detection framework circuitry disclosed herein.

FIG. 19 is a block diagram of an example processor platform 1700 structured to execute and/or instantiate the machine readable instructions and/or operations of FIGS. 12-13 to implement the line detection framework circuitry of FIG. 4. The processor platform 1900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1900 of the illustrated example includes processor circuitry 1912. The processor circuitry 19 of the illustrated example is hardware. For example, the processor circuitry 1912 can be implemented by one or more integrated circuits, logic circuits, FPGAs microprocessors, CPUs, GPUs, DSPs, and/or microcontrollers from any desired family or manufacturer. The processor circuitry 1912 may be implemented by one or more semiconductor based (e.g., silicon based) devices. In this example, the processor circuitry 1912 implements the example vertex feature representation circuitry 302, the example graph neural network circuitry 304, the example post processing circuitry 306, the data interface circuitry 402, the example adjacency matrix generation circuitry 404, the example vertex sorter 406, the example clique assembler circuitry 408, the example polar coordinate circuitry 412, and the example output circuitry 414.

The processor circuitry 1912 of the illustrated example includes a local memory 1913 (e.g., a cache, registers, etc.). The processor circuitry 1912 of the illustrated example is in communication with a main memory including a volatile memory 1914 and a non-volatile memory 1916 by a bus 1918. The volatile memory 1914 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1916 may be implemented by flash memory and/or any other desired type of memory device. Access to the main memory 1914, 1916 of the illustrated example is controlled by a memory controller 1917.

The processor platform 1900 of the illustrated example also includes interface circuitry 1920. The interface circuitry 1920 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1922 are connected to the interface circuitry 1920. The input device(s) 1922 permit(s) a user to enter data and/or commands into the processor circuitry 1912. The input device(s) 1922 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1924 are also connected to the interface circuitry 1920 of the illustrated example. The output devices 1924 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1920 of the illustrated example, thus, typically includes a graphics driver card, a graphics driver chip, and/or graphics processor circuitry such as a GPU.

The interface circuitry 1920 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1926. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1900 of the illustrated example also includes one or more mass storage devices 1928 to store software and/or data. Examples of such mass storage devices 1928 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1932, which may be implemented by the machine readable instructions of FIGS. 12-13, may be stored in the mass storage device 1928, in the volatile memory 1914, in the non-volatile memory 1916, and/or on a removable non-transitory computer readable storage medium such as a CD or DVD.

Figure 20:
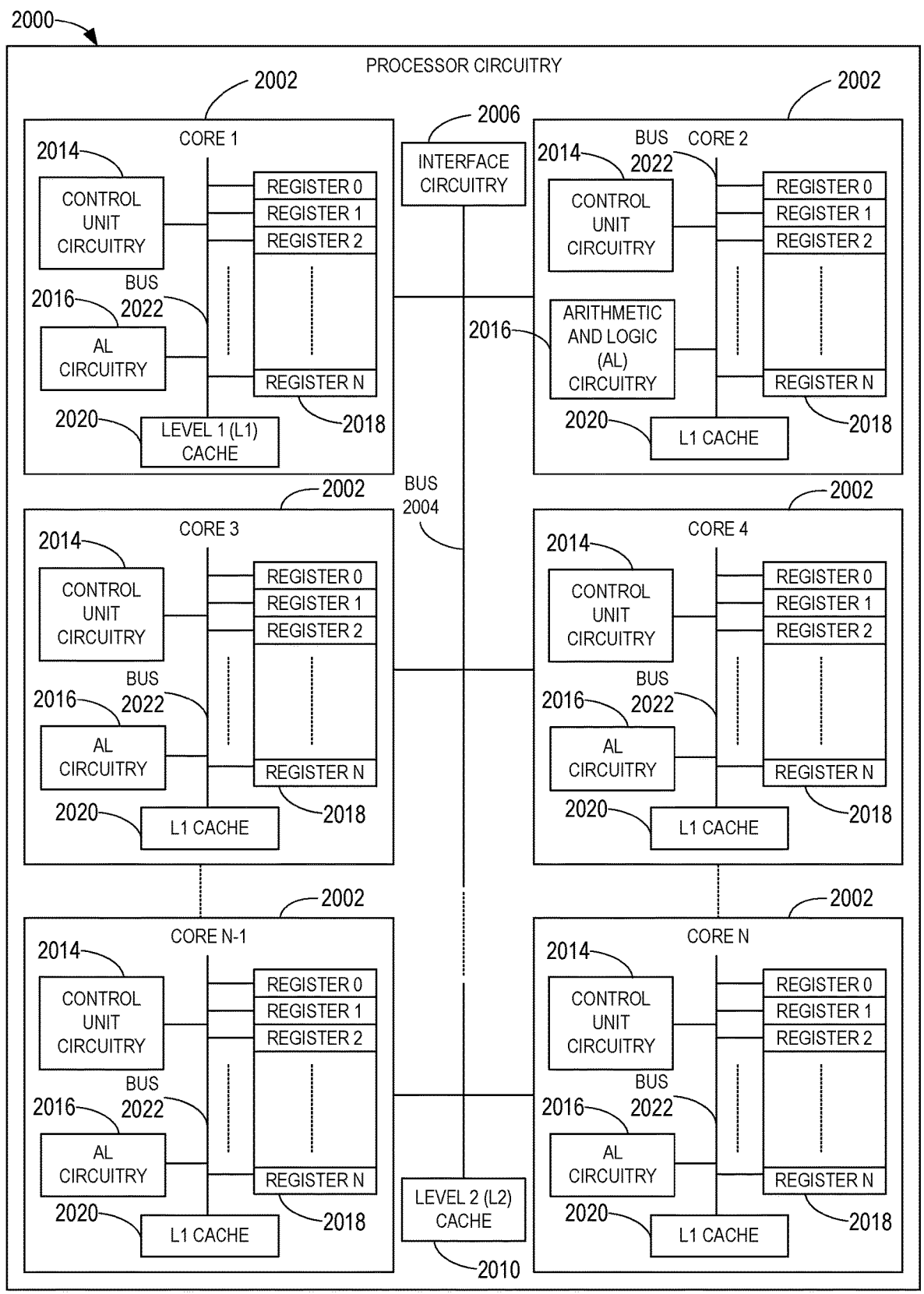
FIG. 20 is a block diagram of an example implementation of the processor circuitry of FIG. 19.

FIG. 20 is a block diagram of an example implementation of the processor circuitry 1912 of FIG. 19. In this example, the processor circuitry 1912 of FIG. 19 is implemented by a microprocessor 2000. For example, the microprocessor 2000 may implement multi-core hardware circuitry such as a CPU, a DSP, a GPU, an XPU, etc. Although it may include any number of example cores 2002 (e.g., 1 core), the microprocessor 2000 of this example is a multi-core semiconductor device including N cores. The cores 2002 of the microprocessor 2000 may operate independently or may cooperate to execute machine readable instructions. For example, machine code corresponding to a firmware program, an embedded software program, or a software program may be executed by one of the cores 2002 or may be executed by multiple ones of the cores 2002 at the same or different times. In some examples, the machine code corresponding to the firmware program, the embedded software program, or the software program is split into threads and executed in parallel by two or more of the cores 2002. The software program may correspond to a portion or all of the machine readable instructions and/or operations represented by the flowcharts of FIGS. 12-13.

The cores 2002 may communicate by an example bus 2004. In some examples, the bus 2004 may implement a communication bus to effectuate communication associated with one(s) of the cores 2002. For example, the bus 2004 may implement at least one of an Inter-Integrated Circuit (I2C) bus, a Serial Peripheral Interface (SPI) bus, a PCI bus, or a PCIe bus. Additionally or alternatively, the bus 2004 may implement any other type of computing or electrical bus. The cores 2002 may obtain data, instructions, and/or signals from one or more external devices by example interface circuitry 2006. The cores 2002 may output data, instructions, and/or signals to the one or more external devices by the interface circuitry 2006. Although the cores 2002 of this example include example local memory 2020 (e.g., Level 1 (L1) cache that may be split into an L1 data cache and an L1 instruction cache), the microprocessor 2000 also includes example shared memory 2010 that may be shared by the cores (e.g., Level 2 (L2_cache)) for high-speed access to data and/or instructions. Data and/or instructions may be transferred (e.g., shared) by writing to and/or reading from the shared memory 2010. The local memory 2020 of each of the cores 2002 and the shared memory 2010 may be part of a hierarchy of storage devices including multiple levels of cache memory and the main memory (e.g., the main memory 1914, 1916 of FIG. 19). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 2002 may be referred to as a CPU, DSP, GPU, etc., or any other type of hardware circuitry. Each core 2002 includes control unit circuitry 2014, arithmetic and logic (AL) circuitry (sometimes referred to as an ALU) 2016, a plurality of registers 2018, the L1 cache 2020, and an example bus 2022. Other structures may be present. For example, each core 2002 may include vector unit circuitry, single instruction multiple data (SIMD) unit circuitry, load/store unit (LSU) circuitry, branch/jump unit circuitry, floating-point unit (FPU) circuitry, etc. The control unit circuitry 2014 includes semiconductor-based circuits structured to control (e.g., coordinate) data movement within the corresponding core 2002. The AL circuitry 2016 includes semiconductor-based circuits structured to perform one or more mathematic and/or logic operations on the data within the corresponding core 2002. The AL circuitry 2016 of some examples performs integer based operations. In other examples, the AL circuitry 2016 also performs floating point operations. In yet other examples, the AL circuitry 2016 may include first AL circuitry that performs integer based operations and second AL circuitry that performs floating point operations. In some examples, the AL circuitry 2016 may be referred to as an Arithmetic Logic Unit (ALU). The registers 2018 are semiconductor-based structures to store data and/or instructions such as results of one or more of the operations performed by the AL circuitry 2016 of the corresponding core 2002. For example, the registers 2018 may include vector register(s), SIMD register(s), general purpose register (s), flag register(s), segment register(s), machine specific register(s), instruction pointer register(s), control register(s), debug register(s), memory management register(s), machine check register(s), etc. The registers 2018 may be arranged in a bank as shown in FIG. 20. Alternatively, the registers 2018 may be organized in any other arrangement, format, or structure including distributed throughout the core 2002 to shorten access time. The bus 2020 may implement at least one of an I2C bus, a SPI bus, a PCI bus, or a PCIe bus Each core 2002 and/or, more generally, the microprocessor 2000 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 2000 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 21:
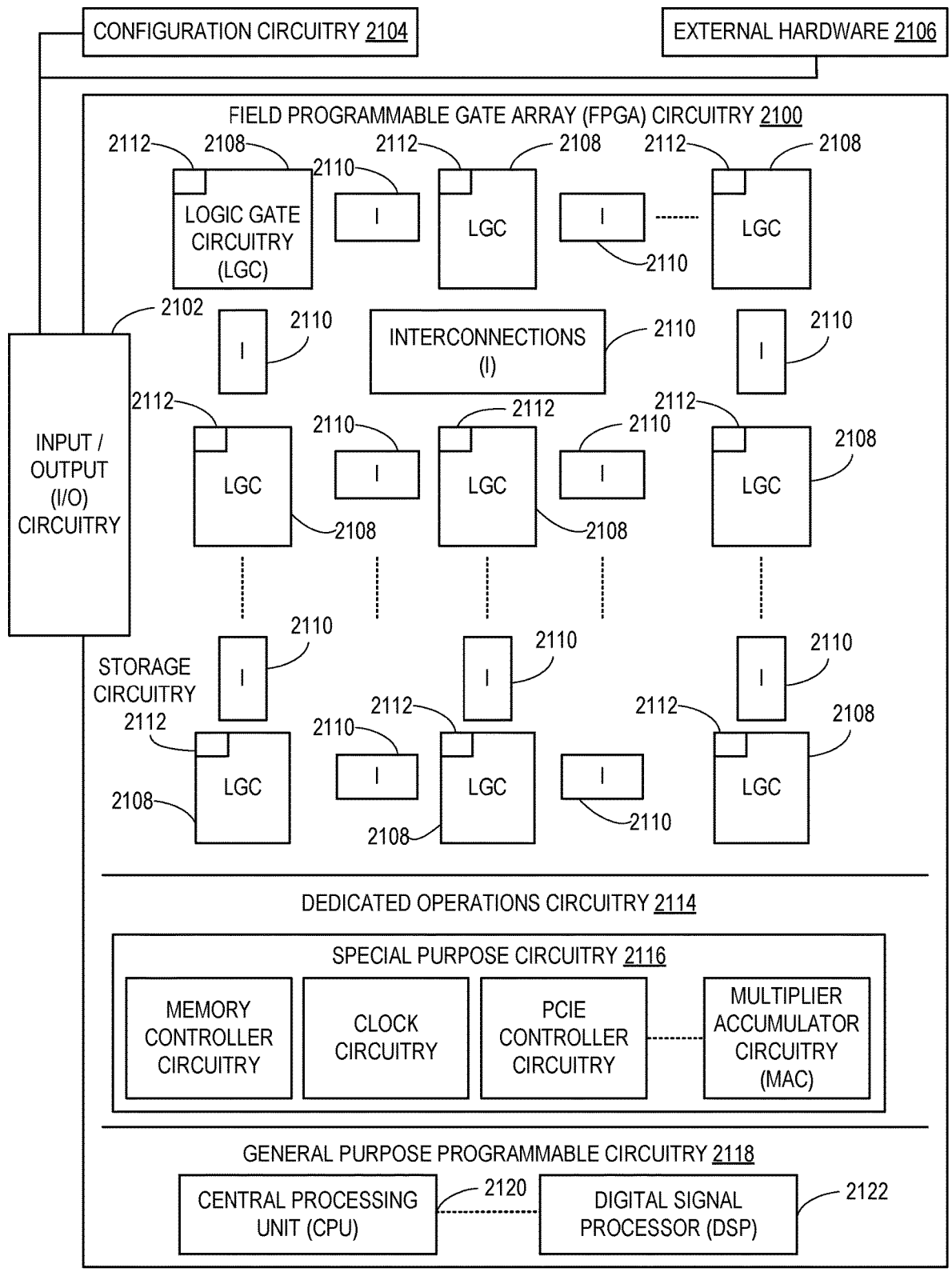
FIG. 21 is a block diagram of another example implementation of the processor circuitry of FIG. 19.

FIG. 21 is a block diagram of another example implementation of the processor circuitry 1912 of FIG. 19. In this example, the processor circuitry 1912 is implemented by FPGA circuitry 2100. The FPGA circuitry 2100 can be used, for example, to perform operations that could otherwise be performed by the example microprocessor 2000 of FIG. 20 executing corresponding machine readable instructions. However, once configured, the FPGA circuitry 2100 instantiates the machine readable instructions in hardware and, thus, can often execute the operations faster than they could be performed by a general purpose microprocessor executing the corresponding software.

More specifically, in contrast to the microprocessor 2000 of FIG. 20 described above (which is a general purpose device that may be programmed to execute some or all of the machine readable instructions represented by the flowcharts of FIGS. 12-13 but whose interconnections and logic circuitry are fixed once fabricated), the FPGA circuitry 2100 of the example of FIG. 21 includes interconnections and logic circuitry that may be configured and/or interconnected in different ways after fabrication to instantiate, for example, some or all of the machine readable instructions represented by the flowcharts of FIGS. 12-13. In particular, the FPGA 2100 may be thought of as an array of logic gates, interconnections, and switches. The switches can be programmed to change how the logic gates are interconnected by the interconnections, effectively forming one or more dedicated logic circuits (unless and until the FPGA circuitry 2100 is reprogrammed). The configured logic circuits enable the logic gates to cooperate in different ways to perform different operations on data received by input circuitry. Those operations may correspond to some or all of the software represented by the flowcharts of FIGS. 12-13. As such, the FPGA circuitry 2100 may be structured to effectively instantiate some or all of the machine readable instructions of the flowcharts of FIGS. 12-13 as dedicated logic circuits to perform the operations corresponding to those software instructions in a dedicated manner analogous to an ASIC. Therefore, the FPGA circuitry 2100 may perform the operations corresponding to the some or all of the machine readable instructions of FIGS. 12-13 faster than the general purpose microprocessor can execute the same.

In the example of FIG. 21, the FPGA circuitry 2100 is structured to be programmed (and/or reprogrammed one or more times) by an end user by a hardware description language (HDL) such as Verilog. The FPGA circuitry 2100 of FIG. 21, includes example input/output (I/O) circuitry 2102 to obtain and/or output data to/from example configuration circuitry 2104 and/or external hardware (e.g., external hardware circuitry) 2106. For example, the configuration circuitry 2104 may implement interface circuitry that may obtain machine readable instructions to configure the FPGA circuitry 2100, or portion(s) thereof. In some such examples, the configuration circuitry 2104 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 2106 may implement the microprocessor 2100 of FIG. 21. The FPGA circuitry 2100 also includes an array of example logic gate circuitry 2108, a plurality of example configurable interconnections 2110, and example storage circuitry 2112. The logic gate circuitry 2108 and interconnections 2110 are configurable to instantiate one or more operations that may correspond to at least some of the machine readable instructions of FIGS. 12-13 and/or other desired operations. The logic gate circuitry 2108 shown in FIG. 21 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 2108 to enable configuration of the electrical structures and/or the logic gates to form circuits to perform desired operations. The logic gate circuitry 2108 may include other electrical structures such as look-up tables (LUTs), registers (e.g., flip-flops or latches), multiplexers, etc.

The interconnections 2110 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 2108 to program desired logic circuits.

The storage circuitry 2112 of the illustrated example is structured to store result(s) of the one or more of the operations performed by corresponding logic gates. The storage circuitry 2112 may be implemented by registers or the like. In the illustrated example, the storage circuitry 2112 is distributed amongst the logic gate circuitry 2108 to facilitate access and increase execution speed.

The example FPGA circuitry 2100 of FIG. 21 also includes example Dedicated Operations Circuitry 2114. In this example, the Dedicated Operations Circuitry 2114 includes special purpose circuitry 2116 that may be invoked to implement commonly used functions to avoid the need to program those functions in the field. Examples of such special purpose circuitry 2116 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 2100 may also include example general purpose programmable circuitry 2118 such as an example CPU 2120 and/or an example DSP 2122. Other general purpose programmable circuitry 2118 may additionally or alternatively be present such as a GPU, an XPU, etc., that can be programmed to perform other operations.

Although FIGS. 20 and 21 illustrate two example implementations of the processor circuitry 1912 of FIG. 19, many other approaches are contemplated. For example, as mentioned above, modern FPGA circuitry may include an on-board CPU, such as one or more of the example CPU 2120 of FIG. 21. Therefore, the processor circuitry 1912 of FIG. 19 may additionally be implemented by combining the example microprocessor 2000 of FIG. 20 and the example FPGA circuitry 2100 of FIG. 21. In some such hybrid examples, a first portion of the machine readable instructions represented by the flowcharts of FIGS. 12-13 may be executed by one or more of the cores 2002 of FIG. 20 and a second portion of the machine readable instructions represented by the flowcharts of FIGS. 12-13 may be executed by the FPGA circuitry 2100 of FIG. 21.

In some examples, the processor circuitry 1912 of FIG. 19 may be in one or more packages. For example, the processor circuitry 2000 of FIG. 20 and/or the FPGA circuitry 2100 of FIG. 21 may be in one or more packages. In some examples, an XPU may be implemented by the processor circuitry 1912 of FIG. 19, which may be in one or more packages. For example, the XPU may include a CPU in one package, a DSP in another package, a GPU in yet another package, and an FPGA in still yet another package.

Figure 22:
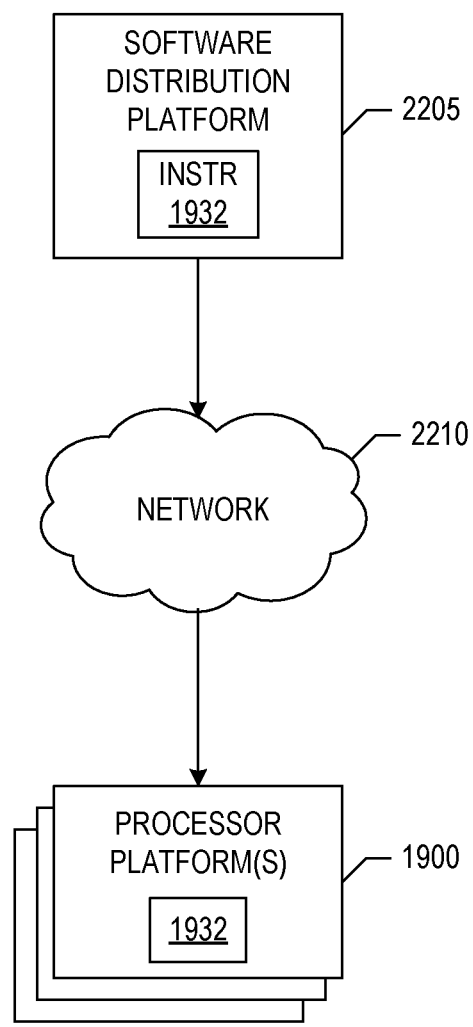
FIG. 22 is a block diagram of an example software distribution platform (e.g., one or more servers) to distribute software (e.g., software corresponding to the example machine readable instructions of FIGS. 12-13) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 2205 to distribute software such as the example machine readable instructions 1932 of FIG. 19 to hardware devices owned and/or operated by third parties is illustrated in FIG. 22. The example software distribution platform 2205 may be implemented by any computer server, data facility, cloud service, etc., capable of storing and transmitting software to other computing devices. The third parties may be customers of the entity owning and/or operating the software distribution platform 2205. For example, the entity that owns and/or operates the software distribution platform 2205 may be a developer, a seller, and/or a licensor of software such as the example machine readable instructions 1932 of FIG. 19. The third parties may be consumers, users, retailers, OEMs, etc., who purchase and/or license the software for use and/or re-sale and/or sub-licensing. In the illustrated example, the software distribution platform 2205 includes one or more servers and one or more storage devices. The storage devices store the machine readable instructions 1932, which may correspond to the example machine readable instructions 1200 and 1300 of FIGS. 12-13, as described above. The one or more servers of the example software distribution platform 2205 are in communication with a network 2210, which may correspond to any one or more of the Internet and/or any of the example networks 1926 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1932 from the software distribution platform 2205. For example, the software, which may correspond to the example machine readable instructions 1932 of FIG. 19, may be downloaded to the example processor platform 1900, which is to execute the machine readable instructions 1932 to implement the line detection framework circuitry 400. In some example, one or more servers of the software distribution platform 2205 periodically offer, transmit, and/or force updates to the software (e.g., the example machine readable instructions 1932 of FIG. 19) to ensure improvements, patches, updates, etc., are distributed and applied to the software at the end user devices.

From the foregoing, it will be appreciated that example systems, methods, apparatus, and articles of manufacture have been disclosed that detect lines from OCR text. The disclosed systems, methods, apparatus, and articles of manufacture improve the efficiency of using a computing device by improving the accuracy of computer vision and reducing errors in line detection in media such as receipts with gaps in between words. The disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to decode receipts based on neural graph architecture are disclosed herein. Further examples and combinations thereof include the following:

Example 1 includes an apparatus for decoding receipts, the apparatus comprising vertex feature representation circuitry to extract features from optical-character-recognition (OCR) words, polar coordinate circuitry to calculate polar coordinates of the OCR words based on respective ones of the extracted features, graph neural network circuitry to generate an adjacency matrix based on the extracted features, post-processing circuitry to traverse the adjacency matrix to generate cliques of OCR processed words, and output circuitry to generate lines of text based on the cliques of OCR processed words.

Example 2 includes the apparatus as defined in example 1 wherein the vertex feature representation circuitry is to generate a feature graph including a plurality of vertices, wherein the ones of the plurality of vertices correspond to the plurality of features of ones of the plurality of OCR processed words.

Example 3 includes the apparatus as defined in example 2 further including vertex sorter circuitry to sort the ones of the vertices from top-to-bottom, and sort the ones of the vertices from left-to-right.

Example 4 includes the apparatus as defined in example 1, further including clique assembler circuitry to determine a first clique for respective ones of the plurality of OCR processed words.

Example 5 includes the apparatus as defined in example 4, wherein the clique assembler circuitry is to determine a first one of the cliques for ones of the plurality of OCR processed words by computing a double connection between a first word and a second word.

Example 6 includes the apparatus as defined in example 4, wherein the clique assembler circuitry is to determine to not add a second word to a first clique in response to the second word being below the first clique by a threshold distance.

Example 7 includes the apparatus as defined in example 1, wherein the features include at least one of cartesian coordinates, polar coordinates, or slope.

Example 8 includes the apparatus as defined in example 7, wherein the cartesian coordinates and the polar coordinates correspond to the center coordinate of a left point of the word and the center coordinate of a right point of the word.

Example 9 includes the apparatus as defined in example 1, wherein the adjacency matrix returns a value of one if there is a connection between a first word and a second word, and a value of zero if there not a connection between a first word and a second.

Example 10 includes the apparatus as defined in example 1, wherein the polar coordinate circuitry concatenates the polar coordinates to a feature vector.

Example 11 includes the apparatus as defined in example 1, wherein the extracted features for a first word are stored as a first feature vector.

Example 12 includes a non-transitory computer readable medium comprising instructions that, when executed, cause processor circuitry to at least extract features from optical-character-recognition (OCR) words, calculate polar coordinates of the OCR words based on respective ones of the extracted features, generate an adjacency matrix based on the extracted features, traverse the adjacency matrix to generate cliques of OCR processed words, and generate lines of text based on the cliques of OCR processed words.

Example 13 includes the non-transitory computer readable medium as defined in example 12, wherein the instructions are to cause the processor circuitry to generate a feature graph including a plurality of vertices, wherein the ones of the plurality of vertices correspond to the plurality of features of ones of the plurality of OCR processed words.

Example 14 includes the non-transitory computer readable medium as defined in example 13, wherein the instructions are to cause the processor circuitry to sort the ones of the vertices from top-to-bottom, and sort the ones of the vertices from left-to-right.

Example 15 includes the non-transitory computer readable medium as defined in example 12, wherein the instructions are to cause the processor circuitry to determine a first clique for respective ones of the plurality of OCR processed words.

Example 16 includes the non-transitory computer readable medium as defined in example 15, wherein the instructions are to cause the processor circuitry to determine a first one of the cliques for ones of the plurality of OCR processed words by computing a double connection between a first word and a second word.

Example 17 includes the non-transitory computer readable medium as defined in example 15, wherein the instructions are to cause the processor circuitry to determine to not add a second word to a first clique in response to the second word being below the first clique by a threshold distance.

Example 18 includes the non-transitory computer readable medium as defined in example 12, wherein the features include at least one of cartesian coordinates, polar coordinates, or slope.

Example 19 includes the non-transitory computer readable medium as defined in example 18, wherein the cartesian coordinates and the polar coordinates correspond to the center coordinate of a left point of the word and the center coordinate of a right point of the word.

Example 20 includes the non-transitory computer readable medium as defined in example 12, wherein the adjacency matrix returns a value of one if there is a connection between a first word and a second word, and a value of zero if there not a connection between a first word and a second.

Example 21 includes the non-transitory computer readable medium as defined in example 12, wherein the polar coordinate circuitry concatenates the polar coordinates to a feature vector.

Example 22 includes the non-transitory computer readable medium as defined in example 12, wherein the extracted features for a first word are stored as a first feature vector.

Example 23 includes an apparatus for decoding receipts, the apparatus comprising means for extracting features from optical-character-recognition (OCR) words, means for calculating polar coordinates of the OCR words based on respective ones of the extracted features, means for generating an adjacency matrix based on the extracted features, means for traversing the adjacency matrix to generate cliques of OCR processed words, and means for generating lines of text based on the cliques of OCR processed words.

Example 24 includes the apparatus as defined in example 23, the apparatus further including means for generating a feature graph including a plurality of vertices, wherein the ones of the plurality of vertices correspond to the plurality of features of ones of the plurality of OCR processed words.

Example 25 includes the apparatus as defined in example 24, the apparatus further including means for sorting the ones of the vertices from top-to-bottom, and means for sorting the ones of the vertices from left-to-right.

Example 26 includes the apparatus as defined in example 23, the apparatus further including means for determining a first clique for respective ones of the plurality of OCR processed words.

Example 27 includes the apparatus as defined in example 26, the apparatus further including means for determining a first one of the cliques for ones of the plurality of OCR processed words by computing a double connection between a first word and a second word.

Example 28 includes the apparatus as defined in example 26, the apparatus further including means for determining to not add a second word to a first clique in response to the second word being below the first clique by a threshold distance.

Example 29 includes the apparatus as defined in example 23, wherein the features include at least one of cartesian coordinates, polar coordinates, or slope.

Example 30 includes the apparatus as defined in example 29, wherein the cartesian coordinates and the polar coordinates correspond to the center coordinate of a left point of the word and the center coordinate of a right point of the word.

Example 31 includes the apparatus as defined in example 23, wherein the adjacency matrix returns a value of one if there is a connection between a first word and a second word, and a value of zero if there not a connection between a first word and a second.

Example 32 includes the apparatus as defined in example 23, wherein the polar coordinate circuitry concatenates the polar coordinates to a feature vector.

Example 33 includes the apparatus as defined in example 23, wherein the extracted features for a first word are stored as a first feature vector. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   interface circuitry to obtain an image of a document;
   machine readable instructions; and
   programmable circuitry to execute the machine readable instructions to at least:
   generate nodes for a feature graph based on features extracted from text boxes, the nodes including polar coordinates indicative of angular positions of the text boxes;
   pass the feature graph through a graph neural network to generate an adjacency matrix; and
   identify text lines in the image of the document by clustering the nodes by line based on the adjacency matrix.

2. The apparatus of claim 1, wherein the nodes further include cartesian coordinates of the text boxes.

3. The apparatus of claim 2, wherein the programmable circuitry is to execute the machine readable instructions to calculate the polar coordinates of the text boxes based on the cartesian coordinates of the text boxes.

4. The apparatus of claim 1, wherein the nodes further include (a) slopes and (b) y-intercepts of the text boxes.

5. The apparatus of claim 1, wherein the nodes correspond to vectors representing respective words extracted from the image of the document.

6. The apparatus of claim 5, wherein the programmable circuitry is to execute the machine readable instructions to cause the graph neural network to identify connections among the words based on the feature graph, the adjacency matrix to indicate the identified connections.

7. The apparatus of claim 1, wherein the programmable circuitry is to execute the machine readable instructions to extract words from the image of the document by applying an optical character recognition algorithm to the image of the document, ones of the words to include respective ones of the text boxes defining cartesian coordinates corresponding to the ones of the words.

8. A non-transitory machine readable storage medium comprising instructions to cause programmable circuitry to at least:
   generate a feature graph based on nodes representative of words in a document image, the nodes including polar coordinates indicative of angular positions of text boxes representing the words;
   pass the feature graph through layers of a graph neural network to generate an adjacency matrix; and
   cluster the nodes based on the adjacency matrix to group ones of the nodes that belong to a same line.

9. The non-transitory machine readable storage medium of claim 8, wherein the nodes further include cartesian coordinates of the text boxes.

10. The non-transitory machine readable storage medium of claim 9, wherein the instructions are to cause programmable circuitry to calculate the polar coordinates of the text boxes based on the cartesian coordinates of the text boxes.

11. The non-transitory machine readable storage medium of claim 8, wherein the nodes further include (a) slopes and (b) y-intercepts of the text boxes.

12. The non-transitory machine readable storage medium of claim 8, wherein the nodes correspond to vectors representing respective words extracted from the document image.

13. The non-transitory machine readable storage medium of claim 12, wherein the instructions are to cause programmable circuitry to cause the graph neural network to identify connections among the words based on the feature graph, the adjacency matrix to indicate the identified connections.

14. The non-transitory machine readable storage medium of claim 8, wherein the instructions are to cause programmable circuitry to extract words from the document image by applying an optical character recognition algorithm to the document image, ones of the words to include respective ones of the text boxes defining cartesian coordinates of the ones of the words.

15. A method comprising:
obtaining an image of a document;
generating, by executing machine readable instructions with programmable circuitry, nodes for a feature graph based on features extracted from bounding boxes of machine-readable words, the nodes including polar coordinates indicative of angular positions of the bounding boxes;
generating, by executing the machine readable instructions with the programmable circuitry, an adjacency matrix by passing the feature graph through a graph neural network; and
grouping, by executing the machine readable instructions with the programmable circuitry, the nodes based on the adjacency matrix to identify text lines in the image of the document.

16. The method of claim 15, wherein the nodes further include cartesian coordinates of the bounding boxes.

17. The method of claim 16, further including calculating the polar coordinates of the bounding boxes based on the cartesian coordinates of the bounding boxes.

18. The method of claim 15, wherein the nodes further include (a) slopes and (b) y-intercepts of the bounding boxes.

19. The method of claim 15, wherein the nodes correspond to vectors representing respective machine readable words extracted from the image of the document.

20. The method of claim 15, further including extracting the machine readable words from the image of the document by applying an optical character recognition algorithm to the image of the document, ones of the words to include respective ones of the bounding boxes defining cartesian coordinates of the ones of the words.

* * * * *